United States Patent
Bondich et al.

(10) Patent No.: US 11,995,781 B2
(45) Date of Patent: May 28, 2024

(54) MESSAGING SYSTEM WITH NEURAL HAIR RENDERING

(71) Applicant: Snap Inc., Santa Monica, CA (US)

(72) Inventors: Artem Bondich, Marina del Rey, CA (US); Menglei Chai, Los Angeles, CA (US); Oleksandr Pyshchenko, Pacific Palisades, CA (US); Jian Ren, Marina Del Ray, CA (US); Sergey Tulyakov, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/987,285

(22) Filed: Nov. 15, 2022

(65) Prior Publication Data

US 2023/0079136 A1    Mar. 16, 2023

Related U.S. Application Data

(63) Continuation of application No. 17/445,549, filed on Aug. 20, 2021, now Pat. No. 11,521,362.

(Continued)

(51) Int. Cl.
  *G06T 19/00*    (2011.01)
  *G06F 18/213*   (2023.01)
  (Continued)

(52) U.S. Cl.
  CPC .......... *G06T 19/006* (2013.01); *G06F 18/213* (2023.01); *G06F 18/214* (2023.01);
  (Continued)

(58) Field of Classification Search
  CPC ......... G06T 7/251; G06T 17/00; G06T 19/20; G06T 19/006; G06T 11/60;
  (Continued)

(56) References Cited

U.S. PATENT DOCUMENTS

| 8,249,365 B1 * | 8/2012 | Winnemoeller ...... G06F 3/0484 |
| | | 382/181 |
| 11,521,362 B2 | 12/2022 | Bondich et al. |
| | (Continued) | |

FOREIGN PATENT DOCUMENTS

| CN | 116250014 A | 6/2023 |
| WO | WO-2022047463 A1 | 3/2022 |

OTHER PUBLICATIONS

"U.S. Appl. No. 17/445,549, Corrected Notice of Allowability dated Aug. 15, 2022", 5 pgs.

(Continued)

*Primary Examiner* — Xilin Guo
(74) *Attorney, Agent, or Firm* — Schwegman Lundberg & Woessner, P.A.

(57) ABSTRACT

A messaging system performs neural network hair rendering for images provided by users of the messaging system. A method of neural network hair rendering includes processing a three-dimensional (3D) model of fake hair and a first real hair image depicting a first person to generate a fake hair structure, and encoding, using a fake hair encoder neural subnetwork, the fake hair structure to generate a coded fake hair structure. The method further includes processing, using a cross-domain structure embedding neural subnetwork, the coded fake hair structure to generate a fake and real hair structure, and encoding, using an appearance encoder neural subnetwork, a second real hair image depicting a second person having a second head to generate an appearance map. The method further includes processing, using a real appearance renderer neural subnetwork, the appearance map and the fake and real hair structure to generate a synthesized real image.

20 Claims, 20 Drawing Sheets

Related U.S. Application Data

(60) Provisional application No. 62/706,522, filed on Aug. 22, 2020.

(51) Int. Cl.

| | | |
|---|---|---|
| *G06F 18/214* | (2023.01) | |
| *G06N 3/045* | (2023.01) | |
| *G06N 3/08* | (2023.01) | |
| *G06T 7/246* | (2017.01) | |
| *G06T 17/00* | (2006.01) | |
| *G06T 19/20* | (2011.01) | |

(52) U.S. Cl.
CPC ............ *G06N 3/045* (2023.01); *G06N 3/08* (2013.01); *G06T 7/251* (2017.01); *G06T 17/00* (2013.01); *G06T 19/20* (2013.01); *G06T 2207/20081* (2013.01); *G06T 2207/20084* (2013.01); *G06T 2215/16* (2013.01); *G06T 2219/024* (2013.01); *G06T 2219/2024* (2013.01)

(58) Field of Classification Search
CPC ....... G06T 2207/20084; G06T 2215/16; G06T 2219/2024; G06T 2207/20081; G06T 2219/024; G06V 10/82; G06V 40/171; G06N 3/047; G06N 3/088; G06N 3/045; G06N 3/084; G06N 3/08; G06F 18/214; G06F 18/213
See application file for complete search history.

(56) References Cited

U.S. PATENT DOCUMENTS

| | | | | |
|---|---|---|---|---|
| 2014/0233849 | A1* | 8/2014 | Weng | G06T 19/20 382/154 |
| 2019/0295272 | A1* | 9/2019 | Aksit | G06V 10/7557 |
| 2020/0175757 | A1* | 6/2020 | Li | G06T 15/00 |
| 2020/0401842 | A1* | 12/2020 | Jiang | G06T 3/0006 |
| 2022/0058880 | A1 | 2/2022 | Bondich et al. | |
| 2022/0222897 | A1* | 7/2022 | Yang | G06V 20/64 |

OTHER PUBLICATIONS

"U.S. Appl. No. 17/445,549, Notice of Allowance dated Aug. 3, 2022", 13 pgs.

"International Application Serial No. PCT/US2021/071239, International Search Report dated Nov. 17, 2021", 6 pgs.

"International Application Serial No. PCT/US2021/071239, Written Opinion dated Nov. 17, 2021", 6 pgs.

Chai, Menglei, et al., "Neural Hair Rendering", arxiv.org, Cornell University Library, 201 Olin Library Cornell University Ithaca, NY 14853, (Jul. 21, 2020), 18 pgs.

Hai, X Pham, et al., "Generative Adversarial Talking Head: Bringing Portraits to Life with a Weakly Supervised Neural Network", arxiv.org, Cornell University Library, 201 Olin Library Cornell University Ithaca, NY 14853, (Mar. 21, 2018), 18 pgs.

Kowalski, Marek, et al., "CONFIG: Controllable Neural Face Image Generation", In: Computer Vision and Pattern Recognition, (May 12, 2020), 25 pgs.

Lin, Yu-Jing, et al., "ReIGAN: Multi-Domain Image-to-Image Translation via Relative Attributes", IEEE/CVF International Conference on Computer Vision (ICCV), IEEE, (Oct. 27, 2019), 5913-5921.

Liu, Ming-Yu, et al., "Generative Adversarial Networks for Image and Video Synthesis: Algorithms and Applications", arxiv.org, Cornell University Library, 201 Olin Library Cornell University Ithaca, NY 14853, (Aug. 6, 2020), 21 pgs.

Tewari, Ayush, et al., "State of the Art on Neural Rendering", EUROGRAPHICS 2020, 39(2), (2020), 27 pgs.

Wei, Lingyu, et al., "Real-Time Hair Rendering Using Sequential Adversarial Network", ICIAP: International Conference on Image Analysis and Processing, 17th International Conference, (2013), 18 pgs.

Zhan, Fangneng, et al., "Spatial Fusion GAN for Image Synthesis", IEEE/CVF Conference on Computer Vision and Pattern Recognition (CVPR), IEEE, (Jun. 15, 2019), 3648-3657.

U.S. Appl. No. 17/445,549, filed Aug. 20, 2021, Messaging System With Neural Hair Rendering.

"International Application Serial No. PCT/US2021/071239, International Preliminary Report on Patentability dated Mar. 9, 2023", 8 pgs.

* cited by examiner

MESSAGING SYSTEM WITH NEURAL HAIR RENDERING

CLAIM OF PRIORITY

This application is a continuation of and claims the benefit of priority of U.S. patent application Ser. No. 17/445,549, filed Aug. 20, 2021, which claims the benefit of priority to U.S. Patent Application Ser. No. 62/706,522, filed Aug. 22, 2020, which are incorporated herein by reference in their entireties.

TECHNICAL FIELD

Examples of the present disclosure relate generally to neural hair rendering within messaging systems. More particularly, but not by way of limitation, examples of the present disclosure relate to rendering hair using neural networks from a 3-dimensional (3D) model onto an image of a person.

BACKGROUND

Rendering human hair is complex because of surface shading, light scattering, semi-transparent occlusions, and soft shadowing, as well as because of the many strands of hair. Traditional computer graphic methods are very complex to implement and computationally demanding, which may make the applications too expensive to develop and which may make the applications too computationally demanding for mobile devices.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
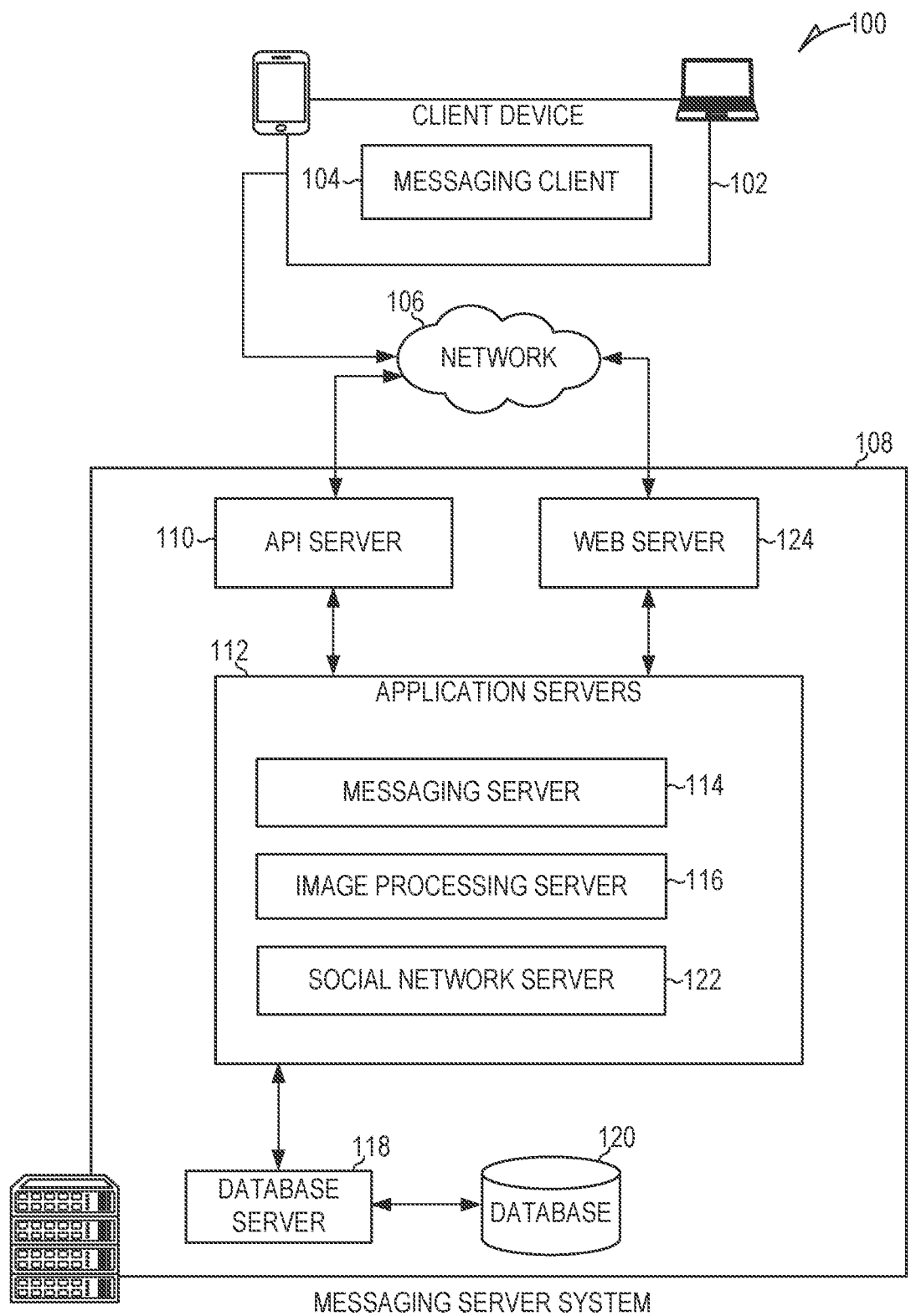
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Disclosed is a messaging system that includes hair rendering. The hair rendering system takes a 3D model of hair which is represented with a simple data structure such as 10 to 50 polygon strips and renders it onto a first image depicting a first person where material features of the hair are taken from a second image depicting a second person. The first and second image may be the same or may be different. The rendering of the 3D model of hair onto the depiction of the first person is more efficient and more realistic than other methods and enables the hair rendering system to render images on a mobile device. Additionally, the hair rendering system supports rendering a series of images in real-time to support video, in accordance with some examples.

The neural network for hair rendering is split into a fake domain that operates on the data structure of the 3D model of hair and a real domain that operates on the first image and the second image. The dramatic difference between the coarse geometry of the 3D hair model and the real hair depicted in an image makes it difficult to design a common data structure for the two. A technical problem is how to train a neural network in an unsupervised manner with two different data structures being used such as the 3D model of hair in the fake domain and a more complex data structure used to represent the material features of the hair in the real domain. The neural network for rendering hair addresses this technical problem by using a shared latent space that is used by both the fake domain and the real domain. The fake domain and the real domain have separate domain structure encoding into the shared latent space. Additionally, in training, the fake domain and the real domain share several layers of neural networks prior to the shared latent space. Moreover, in training, a structure discriminator is used to ensure the encoded structure features, from the fake domain and the real domain, match within the shared latent space. And supervised reconstruction is used in both the fake domain and the real domain to ensure the necessary structure is kept in the shared latent space.

Moreover, the 3D model of hair may be a generic low-quality 3D hair model where isotropic structures of hair strands are represented such as with sparse polygon strip meshes. This type of 3D model is widely used on the internet such as in interactive applications such as games. The rendered hair looks realistic due to the combination of the material or appearance features being taken from an image of real hair and being combined by the neural network with the 3D model of hair.

The supervised reconstruction addresses the technical problem of how to train the neural network when pairs of images are not available for supervised learning. The supervised reconstruction is performed with only one image depicting a person. Pairs of images with a first image of a person and then a second image of the same person with the 3D model of the hair realistically rendered on the person are difficult or expensive to obtain. The supervised reconstruction learning solves the problem by training the fake domain to be able to accurately recreate a rendered image of the 3D model of hair on the first image and by training the real domain to be able to accurately recreate the real image of the person. By using this supervised reconstruction training, the pairs of images, which are often termed a ground truth, are not required.

Moreover, the neural network system provides a means for solving the technical problem of removing flicker in a video of hair rendering. The technical problem is addressed by feeding a previous image into the real domain of the neural network and training the neural network to use a previous image to aid in rendering the current image. The 3D model of hair is used to determine an orientation change from the previous image to the current image. The technical solution provides a temporally smoothed animation of the rendered hair where flicker is reduced or removed. The neural network provides the ability to turn on and off the correction for flicker.

The neural network system provides an interface for a user of a user device to select a 3D model of hair and a second image for providing material features of the hair. The user device then renders the 3D model of hair using the material features on a first image such as live image of the user. The resulting rendered image is then a blend of the second image with the 3D model of hair rendered on the first image with material features of the hair from the second image.

The user may select for the material features used for rendering the hair from the same image where the 3D model of hair is to be rendered so that the interface provides a convenient way for the user to see how the user would look in different 3D models of hair.

The neural network is trained in a first configuration and then reconfigured for production use using a second configuration. The training configuration enables the training using the supervised reconstruction and, as such, is part of the technical solution to training the neural network without a ground truth.

NETWORKED COMPUTING ENVIRONMENT

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
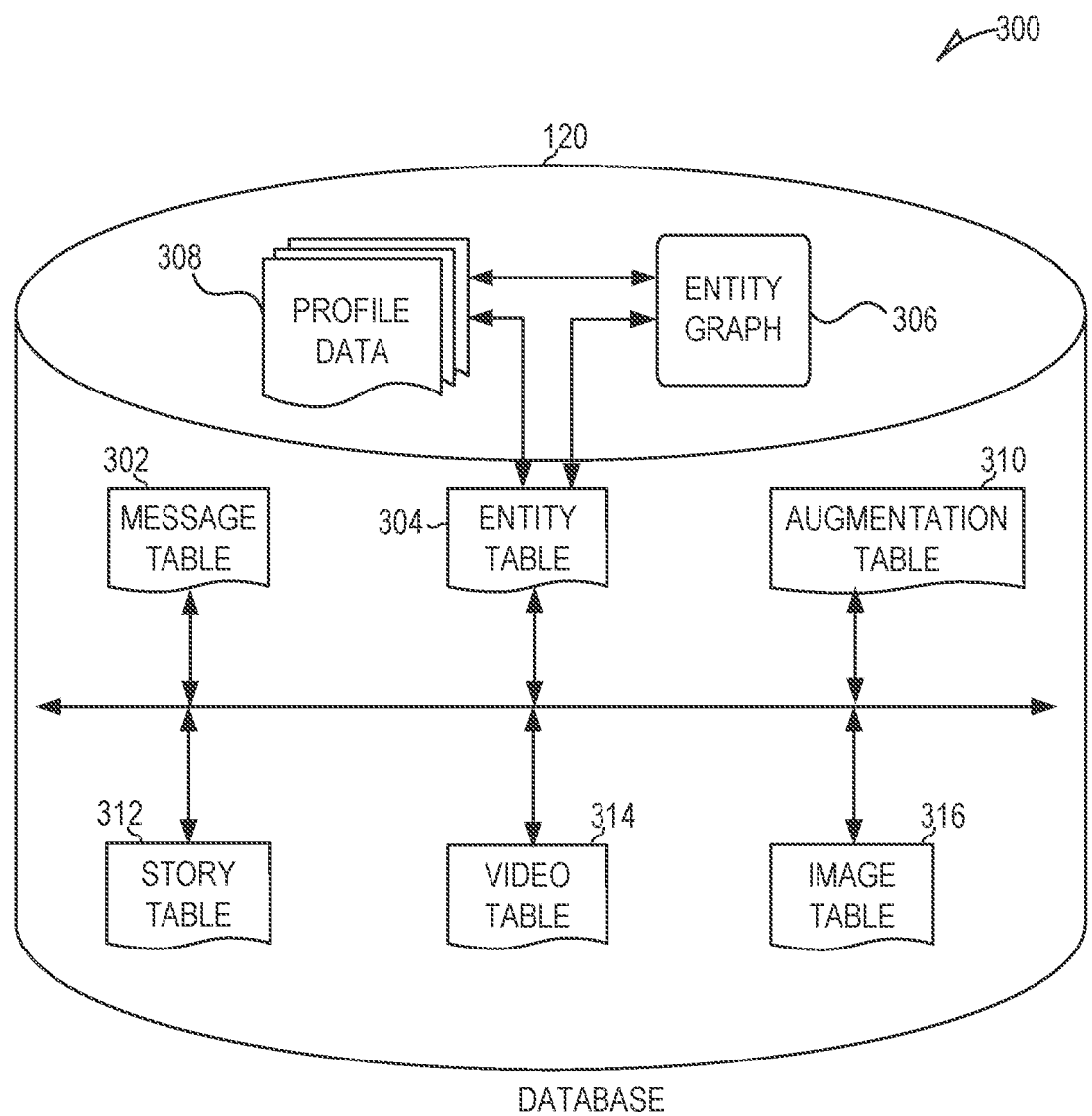
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

SYSTEM ARCHITECTURE

Figure 2:
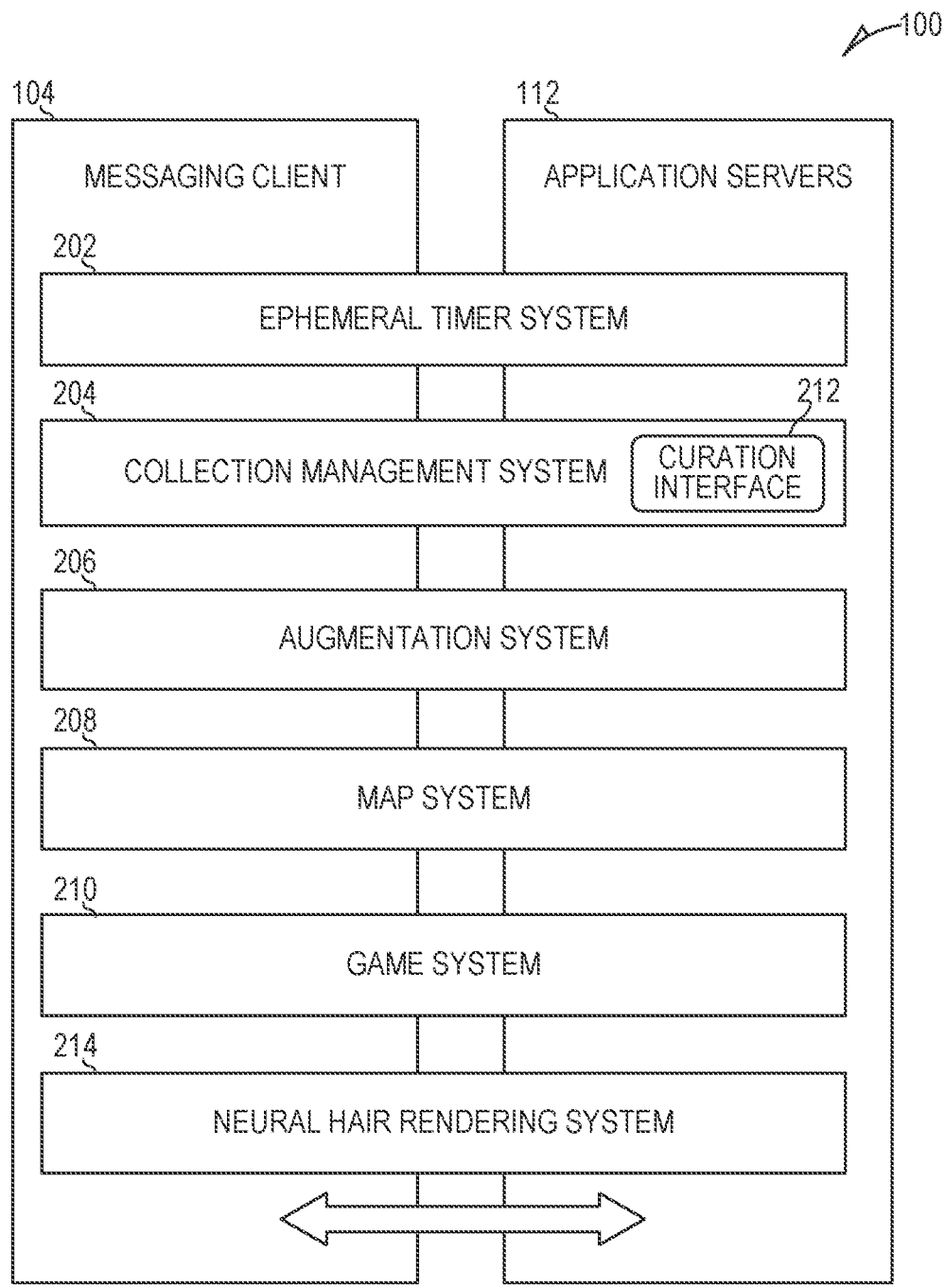
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and a neural hair rendering system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 11:
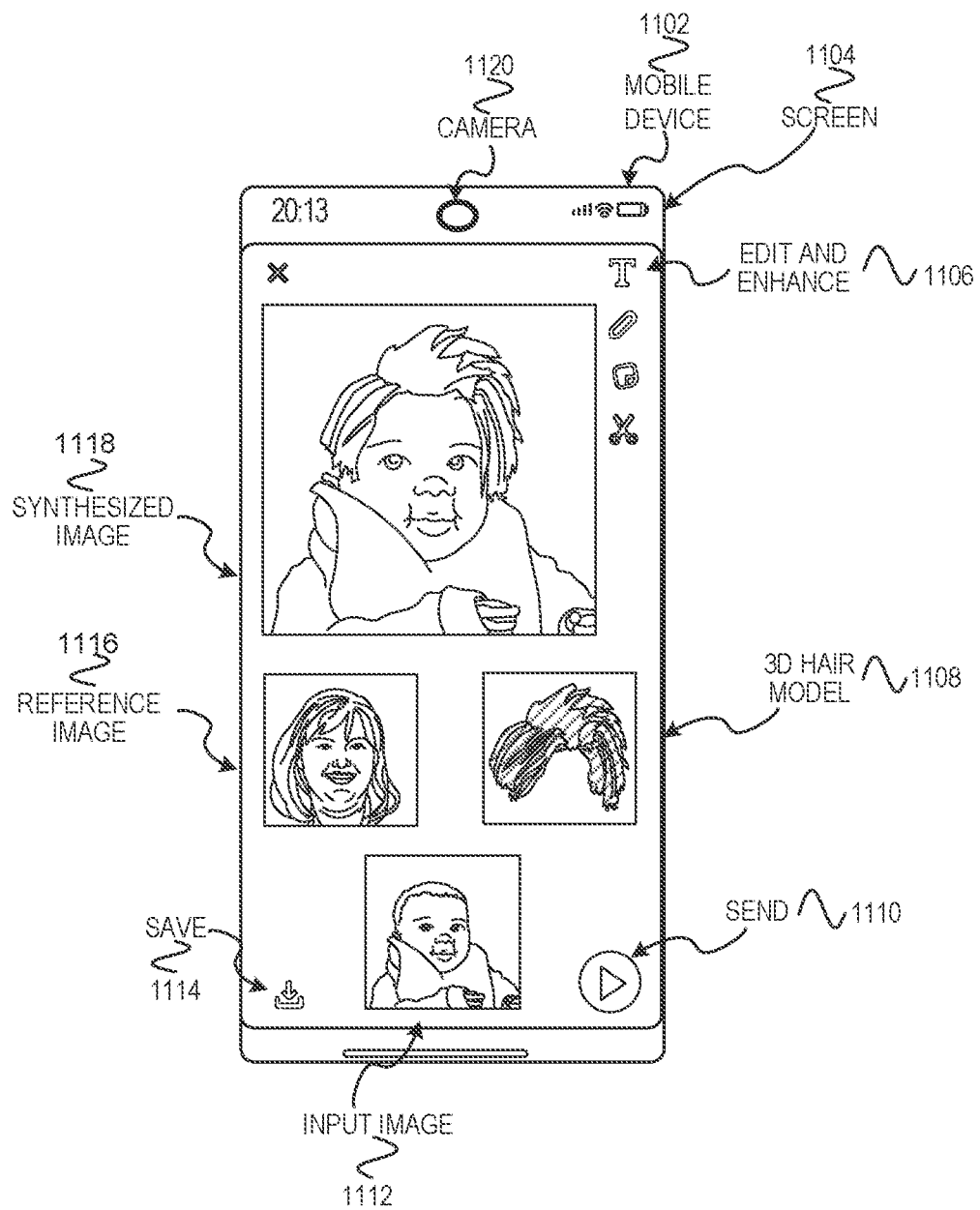
FIG. 11 illustrates an example application illustrating a synthesized image, in accordance with some examples.

The neural hair rendering system 214 provides various functions related to training a system 600 of neural networks and rendering neural hair such as synthesized image 1118 of FIG. 11 using neural hair rendering system 700. The neural hair rendering system 214 provides a means for client devices 102 to download trained neural hair rendering systems 700 as well as download user interfaces such as is described in conjunction with FIG. 11 for performing neural hair rendering. The neural hair rendering system 214 provides access to a database of reference images 1116 and 3D hair models 1108 that may be remotely retrieved by the client device 102. The neural hair rendering system 214 is configured to render neural hair on both single images and videos.

DATA ARCHITECTURE

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape.

Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Figure 6:
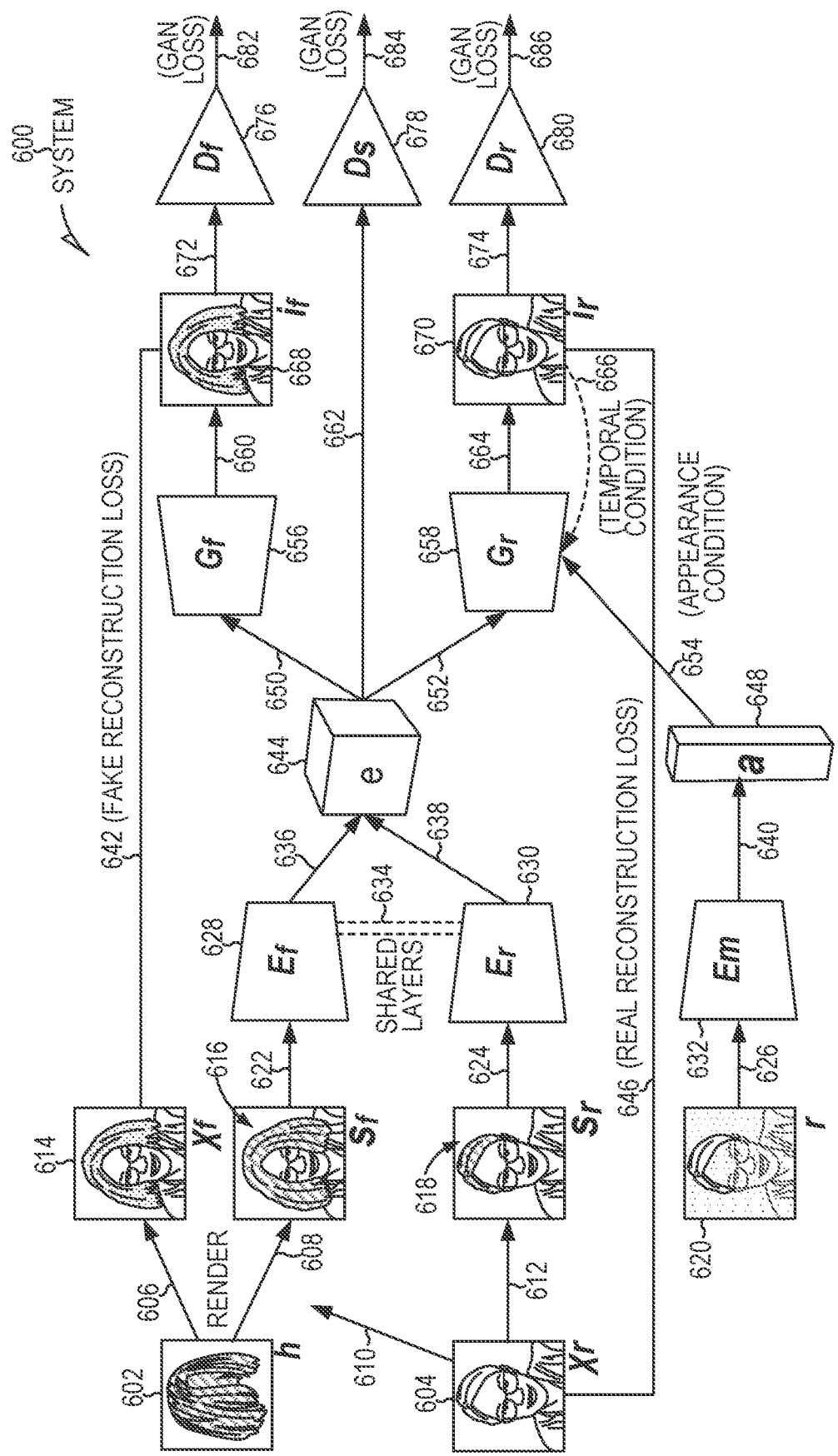
FIG. 6 illustrates a system for training a hair rendering neural network, in accordance with some examples.
Figure 7:
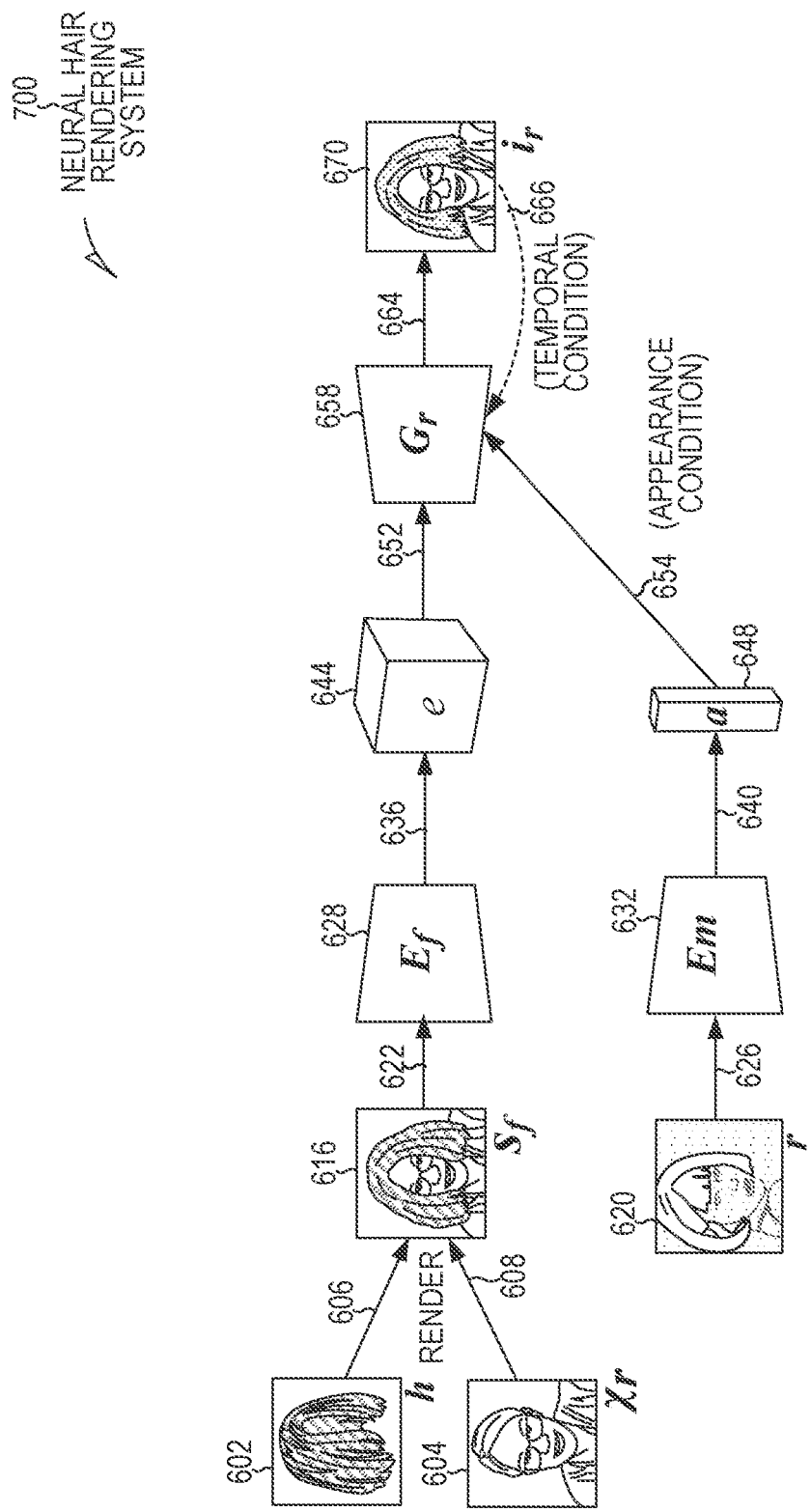
FIG. 7 illustrates a system for neural hair rendering, in accordance with some examples.

The database 120 is configured to store, referring to FIGS. 6, 7, and 11, the weights 804, weights 806, training data 800, 3D hair models 602, and input images 1112.

DATA COMMUNICATIONS ARCHITECTURE

Figure 4:
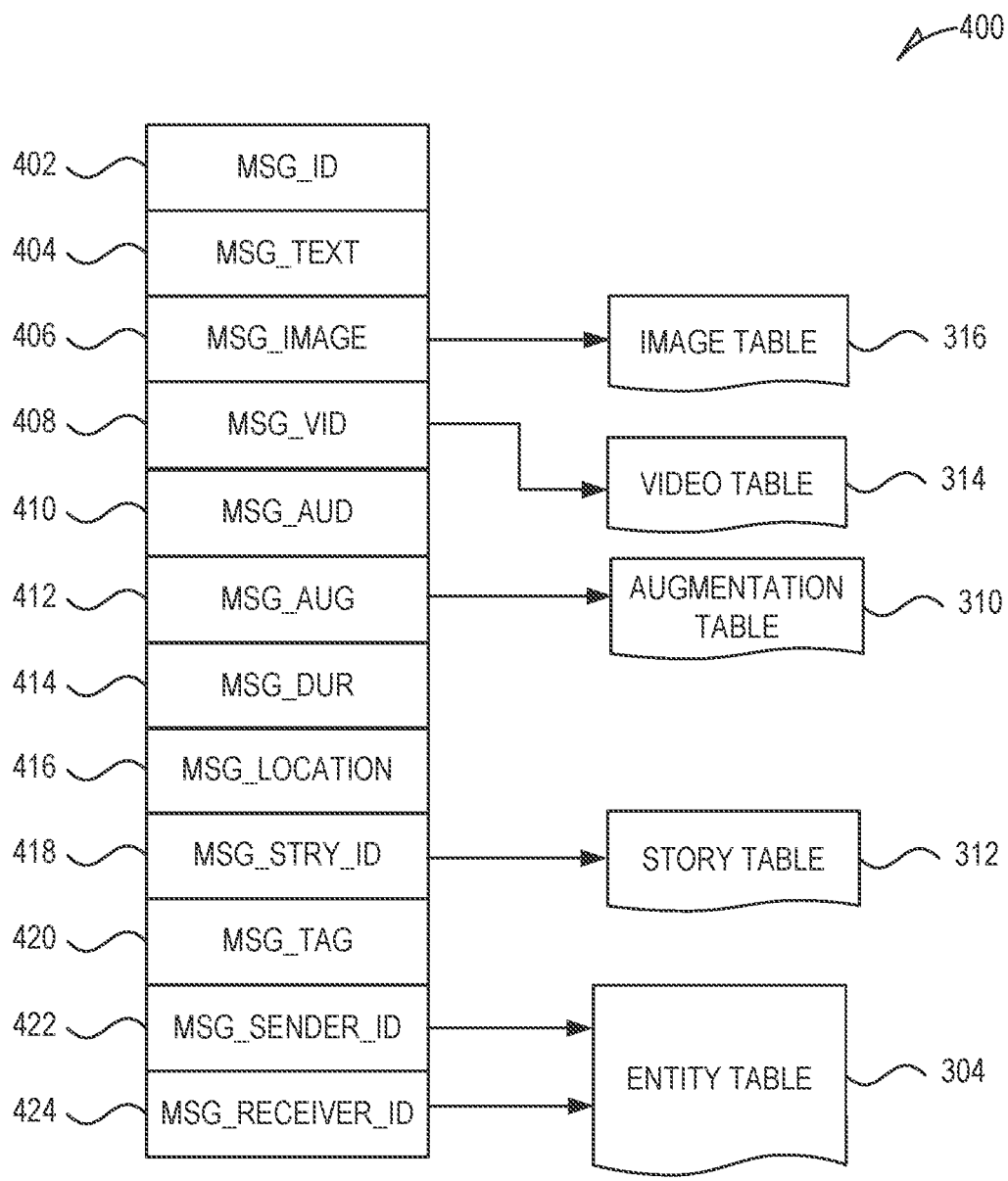
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402: a unique identifier that identifies the message 400. Message text payload 404: text, to be generated by a user via a user interface of the client device 102, and that is included in the message 400.

Message image payload 406: image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414: parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

TIME-BASED ACCESS LIMITATION ARCHITECTURE

Figure 5:
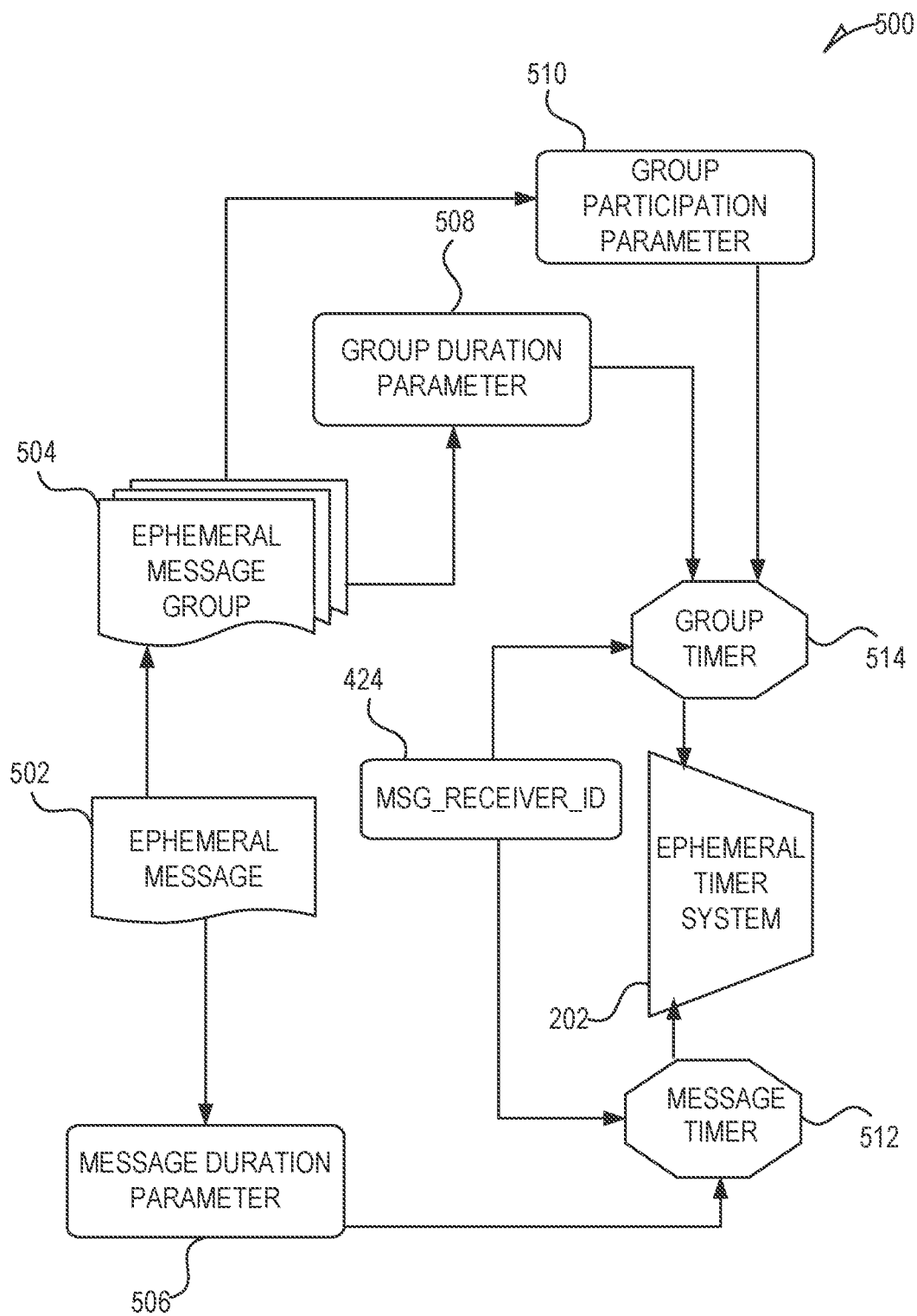
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

NEURAL HAIR RENDERING

FIG. 6 illustrates a system 600 for training hair rendering neural networks, in accordance with some examples. The system 600 trains the neural networks and then the neural networks are used by the neural hair rendering system 700. The system 600 takes as input 3D hair model (h) 602, real hair image ($X_R$) 604, and reference image (r) 620. The output of the system 600 is synthesized fake image ($i_F$) 668 and synthesized real image ($i_R$) 670. Referring to FIGS. 6, 7, 8, and 9, training module 802 trains the system 600 by adjusting weights 804 of the neural networks using the training data 800 with images such as the training data of FIG. 9. The production module 810 uses the neural hair rendering system 700 with weights 806 to generate images such as synthesized image 1118 of FIG. 11.

The top portion leading into fake encoder ($E_F$) 628 is the fake domain and the bottom portion leading into real encoder ($E_R$) 630 is the real domain. The 3-dimenstional (3D) hair model (h) 602 is a 3D model of fake hair. The 3D hair model (h) 602 is represented using a low-quality hair model. Examples of the low-quality hair model include isotropic structures of hair strands and sparse polygon strip meshes. Real hair image ($X_R$) 604 is an image depicting a real person with real hair. In some examples, real hair image ($X_R$) 604 is an image of fake hair such as a cartoon character. The appearance and condition or material properties of the hair depicted in reference image (r) 620 are used for rendering or synthesizing the 3D hair model (h) 602 onto a real head depicted in real hair image ($X_R$) 604. During training, real hair image ($X_R$) 604 and reference image (r) 620 are the same image. The neural network rendering pipeline ($R_n$) is defined as $R_n$=(h, r, c), where h is hair model (h) 602, r is material features extracted from reference image (r) 620, and c are the camera settings.

Figure 8:
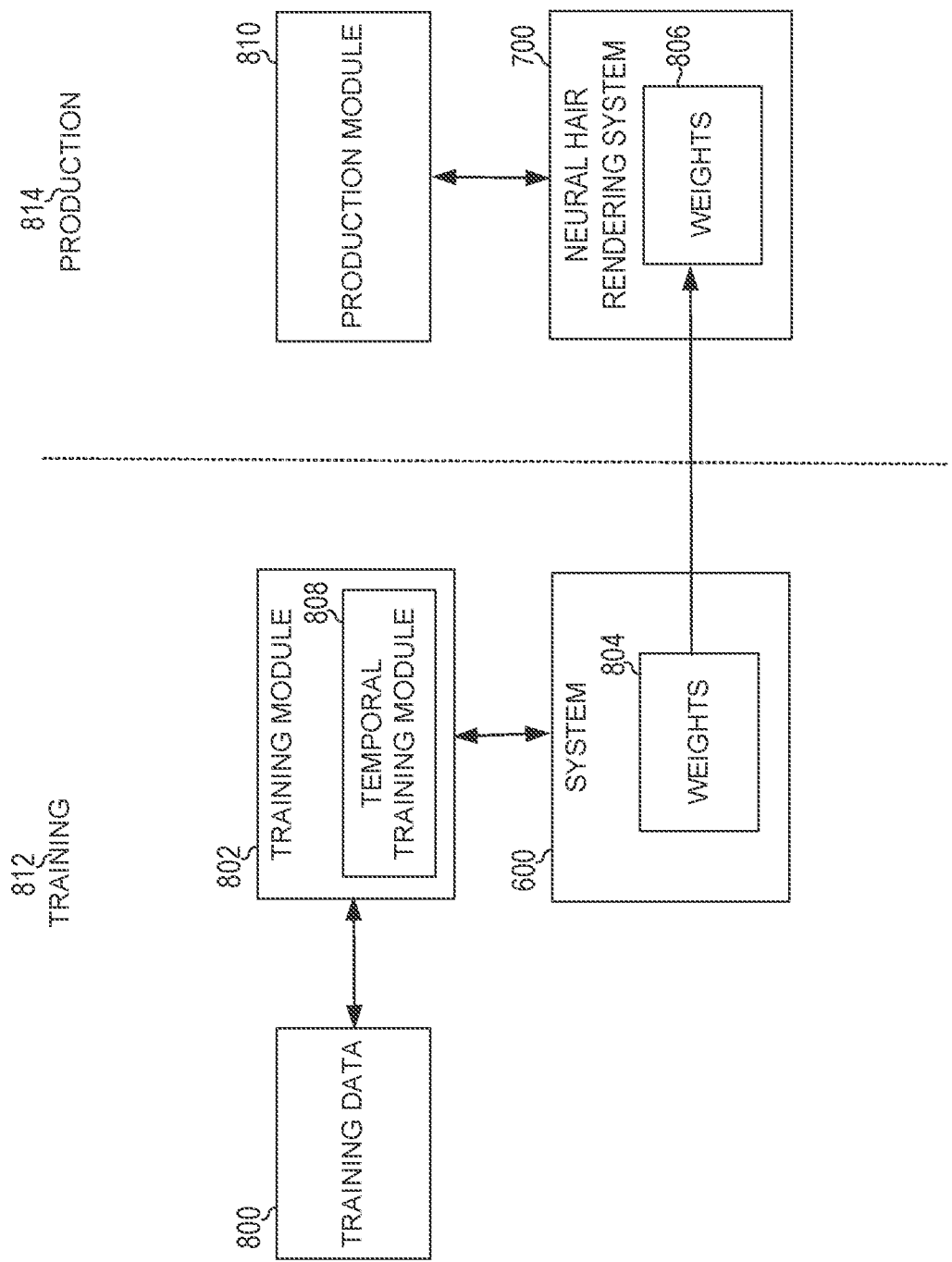
FIG. 8 illustrates training and production, in accordance with some examples.

In operation 606, the training module 802 of FIG. 8 renders fake hair image ($X_F$) 614 from the 3D hair model 602 and real hair image ($X_R$) 604. The data structure information of the 3D hair model (h) 602 is not included in the fake hair image ($X_F$) 614. The training module 802 uses a graphic rendering pipeline to render 3D hair model (h) 602 on real hair image ($X_R$) 604 to generate fake hair image ($X_F$) 614 where rendering may be used with simple diffuse shading in generating the fake hair image ($X_F$). Additionally, in operation 606, prior to rendering the fake hair image ($X_F$) 614, the training module 802 adjusts an orientation of the 3D hair model (h) 602 in accordance with an orientation of the image of the head in the real hair image ($X_R$) 604. Arrow 610 indicates that real hair image 604 ($X_R$) is used in generating the fake hair image ($X_F$) 614 and the structure fake hair (SF) 616. In some examples, training module 802 generates fake hair image ($X_F$) 614 with a uniform-like color appearance and simple diffuse shading so that the final synthetic renderings have a somewhat consistent appearance that can be easily disentangled and may not need extra conditions. In some examples, training module 802 generates fake hair image ($X_F$) 614 to include most or all structural information to enable operation 642 to be able to train the fake appearance renderer ($G_F$) 656 with comparisons with synthesized fake image ($i_F$) 668.

In operation 608, the training module 802 processes the 3D hair model (h) 602 and real hair image 604 ($X_R$) to generate structure fake hair ($S_F$) 616, which is a domain specific structural representation of the 3D hair model (h) 602. The structure fake hair ($S_F$) 616 includes the data structure of the 3D hair (h) 614 and portions of real hair image 604 ($X_R$), in accordance with some examples. Additionally, in operation 608, the training module 802 adjusts an orientation of the 3D hair model (h) 602 in accordance with an orientation of the image of the head in the real hair image ($X_R$) 604. In some examples, the training module 802 is configured to generate structure fake hair ($S_F$) 616 for a given 3D hair model (h) 602 and specified camera parameters. In some examples, the training module 802 uses smoothly varying color gradients as texture to render 3D hair model (h) 602 into a color image that embeds the structure information of the hair geometry where $s_f = S_f(h, c)$, where c is the camera parameters, h is the 3D hair model, and sf is the structure of the fake hair. The camera parameters (c) may be provided by the client device 102. For example, the real hair image ($X_R$) 604 may be captured by the client device 102 and be associated with camera parameters. In some examples, 3D hair model (h) 602 has a granularity of the geometry that is different than real images that makes it difficult to have a similar structural representation as with the real images. In some examples, the 3D hair models (h) 602 are polygon strips, which are widely adopted in real-time scenarios in animation such as video games.

In operation 612, the training module 802 processes the real hair image 604 ($X_R$) to generate a data structure representing the structure of the real hair ($S_R$) 618. Additionally, in operation 612, the training module 802 determines an orientation of the real hair image ($X_R$) 604 and adjusts the orientation of the fake hair image ($X_F$) 614, the structure fake hair ($S_F$) 616, and the structure of the real hair ($S_R$) 618 to agree with one another. The data structure used in the structure of the real hair ($S_R$) 618 is more refined or complex than the structure fake hair ($S_F$) 616. In some examples, the training module 802 constructs a universal structural representation, s, of real hair by applying a dense pixel-level orientation map in the hair region of the real hair image ($X_R$) 604, which may be expressed as $s_r = S_r(x_r)$, where $S_r(x_r)$ is determined with oriented filter kernels and $s_r$ is structure real hair ($S_R$) 618. The training module 802 then determines the structure real hair ($S_R$) 618 so that it contains local hair strand flow structures. In some examples, the training module 802 is configured to perform hair segmentation using standard models to generate structure real hair ($S_R$) for the hair region of the real hair images ($X_R$) 604 of the training data 800.

The training module 802 generates structure fake hair ($S_F$) 616 by exporting color textures that encode surface tangents of the mesh of hair. The training module 802 uses the same shading parameters, including lighting and color, to enforce a uniform appearance of hair between the fake and the real domains so that the system 600 can disentangle the different structures used in structure real hair ($S_R$) 618 and structure fake hair ($S_F$) 616.

In operation 622, the training module 802, feeds the structure fake hair ($S_F$) 616 into the appearance encoder ($E_f$) 628. The appearance encoder ($E_f$) 628 is a multiple-layer neural network or residual neural network.

In operation 624, the training module 802, feeds the structure real hair ($S_R$) 618 into the real encoder ($E_R$) 630 to generate coded real hair structure. The real encoder ($E_R$) 630 is a multiple-layer neural network or a residual neural network. The fake encoder ($E_F$) 628 and real encoder ($E_R$) 630 have a same or similar network structure. In some examples, fake encoder ($E_F$) 628 and real encoder ($E_R$) 630 have five down sampling convolution layers followed by six residual blocks (ResBlks) layers. A residual block in a neural network where some layers feed into the next layer and directly into layers 2 or 3 hops away. The number of layers may be different. The shared layers 634 are weight-sharing to enforce the cross-domain structure embedding (e) 644. The shared layers 634 indicate that weights are shared between shared layers of fake encoder ($E_F$) 628 and real encoder ($E_R$) 630. The number of shared layers 634 may be different.

In operation 626, the training module 802, processes the reference image (r) 620 with the appearance encoder ($E_m$) 632 to encode material properties of the hair from reference image (r) 620. Reference image (r) 620 is an image that is used by appearance encoder ($E_m$) 632 to extract appearance features of the image of the hair depicted in the reference image (r) 620. Appearance encoder ($E_m$) 632 is a multiple-layer neural network with weights. Appearance encoder ($E_m$) 632 encodes material properties of the hair from reference image (r) 620. Appearance encoder ($E_m$) 632 extracts the appearance feature vector on r×$m_r$ (r cross (m sub r)) with five down-sampling convolutional layers and an average pooling layer where r is the reference image (r) 620 and $m_r$ is a target real hair mask (m). $E_a(r)$ is the output of appearance encoder ($E_m$) 632 where r is reference image (r) 620 that may be used to construct feature map $a_{r,s\ sub\ r}$ ((a sub r), (s sub r)) by duplicating it spatially in the target hair mask $m_s$ as follows in Equation (1) where $m_{s\ sub\ r}$ (m sub (s sub r)) is the mask for the structure of the real image.

$$a_{r,s_r}(p) = \begin{cases} E_m(r), & \text{if } m_{s_r}(p) = 1, \\ 0, & \text{if } m_{s_r}(p) = 0. \end{cases} \qquad \text{Equation (1)}$$

In operation 636, the training module 802 feeds the output of the fake encoder ($E_F$) 628 into the cross-domain structure embedding (e) 644 to generate coded fake hair structure. In operation 638, the training module 802 feeds the output of the real encoder ($E_R$) 630 into the cross-domain structure embedding (e) 644. Cross-domain structure embedding (e) 644 is a multiple-layer neural network that is shared by fake encoder ($E_F$) 628 and real encoder ($E_R$) 630 and encodes latent features of the data structures of the fake hair and the real hair as is described herein.

In operation 640, the training module 802 feeds the output of the appearance encoder ($E_m$) 632 into feature map A 648. The training module 802 determines the feature map using Equation (1) as described above.

In operation 642, the training module 802 determines the fake reconstruction loss, which is a measure of the difference between the synthesized fake image ($i_F$) 668 and the fake hair image ($X_F$) 614.

In operation 646, the training module 802 determines the real reconstruction loss, which is a measure of the difference between the synthesized real image (iR) 670 and the real hair image ($X_r$) 604.

In operations 650, 662, and 652 the training module 802 feeds the output of the cross-domain structure embedding (e) 644 into fake appearance renderer ($G_F$) 656, structure discriminator ($D_S$) 678, and the real appearance renderer ($G_R$) 630, respectively. The output of the cross-domain structure embedding (e) 644 is termed fake and real hair structure.

In operation 654, the training module 802 feeds the output of feature map A 648 into the real appearance renderer ($G_R$) 630. The output of feature map A 648 provides material feature such as the appearance and condition of the hair in the reference image (r) 620. In some examples, positions of the feature map A 648 are set to 0 if the positions are outside of hair of the synthesized real image, where the feature map A 648 with the positions set to 0 is termed an appearance map.

In operation 660, the training module 802 processes the output of the cross-domain structure embedding (e) 644 with fake appearance renderer 656 to generate the synthesized fake image ($i_F$) 668. The fake appearance renderer ($G_F$) 656 is trained based on the fake reconstruction loss, which is a measure of the difference between the fake hair image ($X_F$) 614 and synthesized fake image ($i_F$) 668. The training is described below and includes fake discriminator ($D_f$) 676. Fake appearance renderer ($G_F$) 656 is being trained to reconstruct fake hair image ($X_F$) 614 from the structure fake hair 616 as encoded by fake encoder ($E_F$) 628. The training of fake appearance renderer ($G_F$) 656 ensures that cross-domain structure embedding (e) 644 encodes enough information from the structure fake hair ($S_F$) 616 rather than learning to render various appearances. In some examples, fake appearance renderer ($G_F$) 656 includes two ResBlks and then five consecutive up sampling transposed convolutional layers followed by one final convolutional layer.

In operation 662, training module 802 feeds the output of the cross-domain structure embedding (e) 644 into the structure discriminator ($D_S$) 678.

In operation 664, the training module 802 processes the output of the cross-domain structure embedding (e) 644, the output of feature map A 648, and, optionally, temporal condition with real appearance renderer 658 to generate the synthesized real image ($i_R$) 670. Fake appearance renderer ($G_F$) 656 and real appearance renderer ($G_R$) 658 are termed the appearance rendering subnetwork.

In some examples, fake appearance renderer ($G_F$) 656 and real appearance renderer ($G_R$) 658 do not share weights since the neural hair rendering is a unidirectional translation that attempts to map the rendered 3D model in the fake domain to real images in the real domain. In some examples, real appearance renderer ($G_R$) 658 includes generative ResBlks such as spatially adaptive denormalization (SPADE) blocks followed by several consecutive up sampling transposed convolutional layers that are then followed by one or more final convolutional layers. The generative ResBlks use appearance feature maps $a_{r,s}$ (a sub (r, s)) at different scales to condition the generation of the synthesized real image ($i_R$) 670 where "a" are the feature maps, "r" is real image, and "s" is the structure of the hair of the real image. The fake appearance renderer ($G_F$) 656 and real appearance renderer ($G_R$) 658 are termed the fake appearance renderer neural subnetwork and the real appearance renderer neural subnetwork, respectively.

Figure 13:
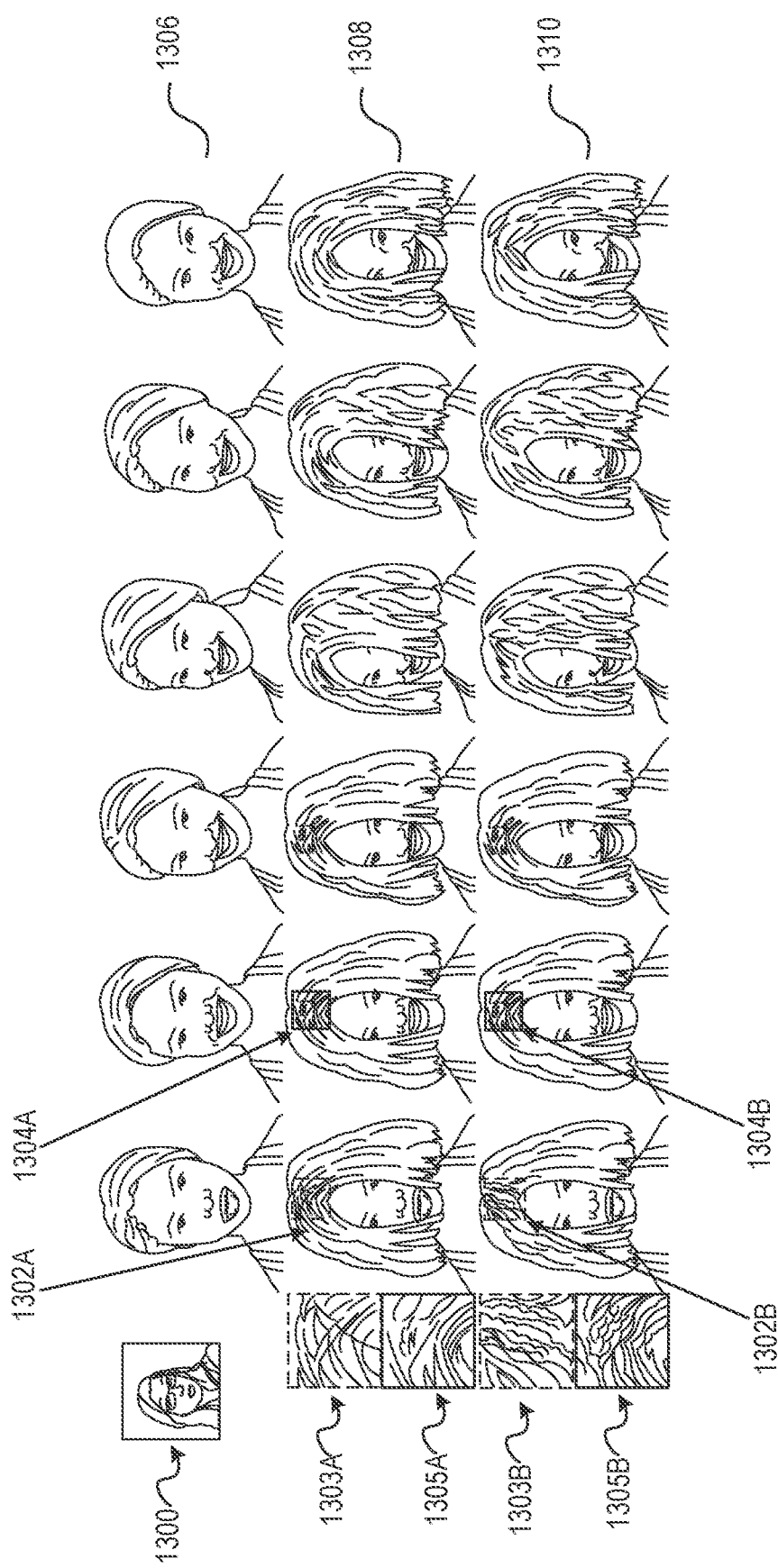
FIG. 13 illustrates the temporal conditioning results, in accordance with some examples.

In operation 666, the training module 802 determines and feeds a temporal condition, which is a warped result (W) of a previous frame $W(i^{t-1}, w^t)$, into the real appearance renderer ($G_R$) 658. The temporal condition in operation 666 is for smoothing the results of modifying a sequence of images I={$i^0, i^1, \ldots, i^T$} that are used as a video. FIG. 13, as discussed below, illustrates that the sequence of images may be choppy without real appearance renderer ($G_R$) 658 being trained with $W(i^{t-1}, w^t)$ as an input. The 3D hair model (h) 602 is used to determine the hair motion flow $w^t$ for each pair of frames t−1 and t, which are used to warp image I from t−1 to t as $W(i, w^t)$. The warped result of the previous frame $W(i^{t-1}, w^t)$ is feed into real appearance renderer ($G_R$) 658 when generating current frame $i^t$. The temporal training module 808 of FIG. 8 is configured to fix all weights in the system 600 except those of the real appearance renderer ($G_R$) 658 and continue to use the objective of Equation (7) but randomly, for example 50% of the time, concatenate real hair image ($X_R$) 604 into the condition inputs of the generative ResBlks of the real appearance renderer ($G_R$) 658 at time t ($G_r^t$). The generation pipeline of the real branch with the temporal condition in operation 666 is $G_r^t(E_r(s_r), a_{r,s\ sub\ r}, x_r)$ so that the system 600 learns to preserve the temporal consistency if the previous frame is inputted as the temporal condition or is generated randomly from scratch if the temporal condition is set to zero. Equation (2) is the rendering equation for sequential generation.

$$i^t = R_n(h, r, c^t) = \begin{cases} G_r\left(E_f(s_f^t), a_{r,s_f^t}\right), & \text{if } t = 0, \\ G_r^t\left(E_f(s_f^t), a_{r,s_f^t}, W(i^{t-1}, w^t)\right), & \text{if } t > 0, \end{cases} \quad \text{Equation (2)}$$

$$s_f^t = S_f(h, c^t).$$

In operation 672, training module 802, determines the values of fake discriminator ($D_f$) 676 from synthesized fake image ($i_f$) 668 during training to determine changes to the weights of the system 600.

In operation 674, training module 802, determines the values of real discriminator ($D_R$) 680 from synthesized real image ($i_R$) 670 during training to determine changes to the weights of the system 600.

In operation 682, the training module 802 determines the adversarial losses of the fake discriminator ($D_F$) 676, which is a neural network, in accordance with Equation (3). The synthesized fake image ($i_F$) 668 can be represented as $G_f(E_f(s_f))$. Equation (3):

$$\mathcal{L}_{D_f} = \mathbb{E}_{x_f}[\log(D_f(x_f))] + \mathbb{E}_{s_f}[\log(1-D_f(G_f(E_f(s_f))))].$$

In operation 684, the training module 802 determines the adversarial losses/gains of the structure discriminator ($D_S$) 678 in accordance with Equation (4). The structure discriminator ($D_S$) 678 is a neural network that distinguishes between the latent feature maps of the real and fake domains within the cross-domain structure embedding (e) 644, in accordance with Equation (4). Structure discriminator ($D_S$) 678 ensures that the shared latent space between the fake encoder ($E_f$) 628 and the real encoder ($E_r$) 630 within the cross-domain structure embedding (e) 644 is domain invariant. The data structures used in the fake domain are less complex than the data structures used in the real domain. In some examples, the cross-domain structure embedding (e) 644, structure real hair ($S_R$) 618, real encoder ($E_R$) 630, and structure discriminator ($D_S$) 678 are termed the structure adaptation subnetwork. Equation (4):

$$\mathcal{L}_{D_S} = \mathbb{E}_{s_r}[\log(D_s(E_r(s_r)))] + \mathbb{E}_{s_f}[\log(1-D_s(E_f(s_f)))],$$

where L is the loss/gain of the structure discriminator ($D_S$) 678, and E is the expected value over $S_R$.

In operation 686, the training module 802 determines the adversarial losses/gains of the real discriminator ($D_R$) 680 in accordance with Equation (5). The synthesized real image ($i_R$) 670 can be represented as $G_r(E_r(s_r), a_{r,s\_sub\_r})$. Equation (5):

$$\mathcal{L}_{D_r} = \mathbb{E}_{x_r}[\log(D_r(x_r))] + \mathbb{E}_{s_r,r}[\log(1 - D_r(G_r(E_r(s_r), a_{r,s_r})))],$$

The training module 802 determines perceptual losses in accordance with Equation (6) to measure high-level feature distance in the paired data.

$$\mathcal{L}_p = \sum_{l=0}^{L} \|\Psi_l(G_r(E_r(s_r), a_{r,s_r})) - \Psi_l(x_r)\|_1 +$$

$$\|\Psi_l(G_f(E_f(s_f))) - \Psi_l(x_f)\|_1,$$

where $\psi_l(i)$ determines the activation feature map of input image I at the lth selected layer. The training objective is represented in Equation (7):

$$\min_{E,G} \max_{D} \left( \lambda_s \mathcal{L}_{D_s} + \lambda_g \left( \mathcal{L}_{D_r} + \mathcal{L}_{D_f} \right) + \lambda_p \mathcal{L}_p \right),$$

where $\lambda_p$, $\lambda_s$, and $\lambda_g$ are weights that may be adjusted by the training module 802.

One skilled in the art will recognize that variations of the system 600 may be used. For example, one or more of the following examples may be used in system 600: a different number of shared layers 634, a different number of ResBlks, and a different number of layers of the neural networks. One or more of the operations may be optional or performed in a different order. The training module 802 and/or the production module 810 are configured to perform the operations of the system 600.

FIG. 7 illustrates neural hair rendering system 700, in accordance with some examples. The training module 802 trains the system 600 of FIG. 6 to determine weights 804. The system 600 is then restructured into neural hair rendering system 700 with weights 806, which are the portion of weights 804 corresponding to fake encoder ($E_f$) 628, appearance encoder ($E_m$) 632, cross-domain structure embedding (e) 644, and feature map A 648, and real appearance renderer ($G_R$) 658. The production module 810 uses the neural hair rendering system 700 to generate synthesized real image ($I_r$) 670 from inputs 3D hair model (h) 602, real hair image ($X_R$) 604, and reference image (r) 620. The rendering equation is represented as disclosed in Equation (8). Equation (8): $R_n(h, r, c) = G_r(E_f(S_f(h,c)), E_m(r))$, where $S_f(h, c)$ renders the structure encoded image structure fake hair ($S_f$) 616, h is the 3D hair model 602, and c is camera parameters for 3D hair model 602. The temporal condition in operation 666 is used to generate smoother sequences of images as discussed herein.

FIG. 8 illustrates training 812 and production 814, in accordance with some examples. In training 812, the training module 802 determines the weights 804 using training data 800 as inputs. In production 814, the production module 810 uses the neural hair rendering system 700 with weights 806 to perform the operations of the neural hair rendering system 700.

Figure 9:
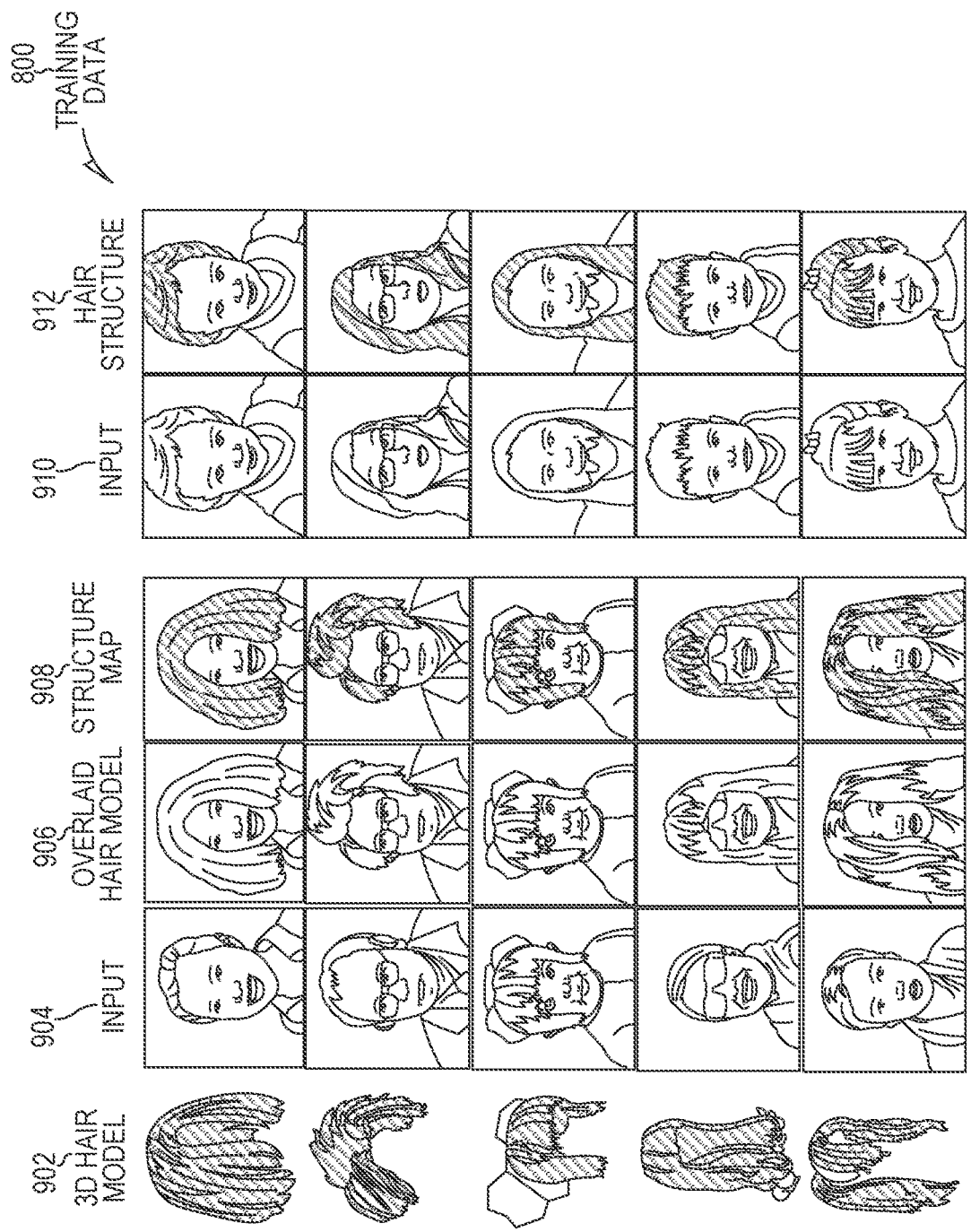
FIG. 9 illustrates training data, in accordance with some examples.

FIG. 9 illustrates training data 800, in accordance with some examples. Illustrated in FIG. 9 is 3D hair models 902, input 904, overlaid hair model 906, structure map 908, input 910, and hair structure 912. In one example, for training the system 600, the training module 802 uses the 3D hair models 902 as the 3D hair model (h) 602; the input 904, 910 as the real hair image ($X_R$) 604; the overlaid hair model 906 as the fake hair image ($X_F$) 614; the structure map 908 as the structure fake hair ($S_F$) 616; and the hair structure 912 as the structure real hair ($S_R$) 618. In this example, the training module 802 does not need to generate structure real hair ($S_R$) 618, fake hair image ($X_F$) 614, and structure real hair ($S_R$).

In another example, the training module 802 generates structure real hair ($S_R$) 618, fake hair image ($X_F$) 614, and structure real hair ($S_R$) and uses the training data 800 to train neural networks to generate structure real hair ($S_R$) 618, fake hair image ($X_F$) 614, and structure real hair ($S_R$).

In another example, the training module 802 is configured to generate structure real hair ($S_R$) 618, fake hair image ($X_F$) 614, and structure real hair ($S_R$) 618 from input 904 or input 910, which are used as real hair image ($X_R$) 604, and a 3D hair model 902, which is used as 3D hair model (h) 602. For example, the training data 800 can include publicly available photos that comprise a wide variety of hairstyles, shapes, and appearances. These publicly available photos can be combined with many 3D hair models (h) 602, in different combinations to create a training set. The training data 800, in one example, was 65,000 images where 5,000 images were used for testing and 60,000 images were used for training. The number of 3D hair models (h) 602 was ten to twenty.

In some examples, for training and testing, five models of 3D hair model (h) 602 were created as 3D hair model 902. Each of the 3D hair models 902 consist of 10 to 50 polygon strips. The 3D hair models 902 are different than one another to have a broad range of 3D hair models 902. One or more 3D hair models 902 are used by the training module 802 to form training pairs with the training data 800 where input 904 or input 910 is paired with one or more of the 3D hair models 902. The training module 802 uses the pairs to train the system 600. In some examples, one or more of overlaid hair model 906, structure map 908, and hair structure 912 are not used for training but for testing whether the trained neural hair rendering system 700 is flexible enough to provide a good result for a 3D hair model 902 in which the system 600 was not trained.

Returning to FIG. 8, the training module 802 trains the system 600 as follows. In a first operation, the training module 802 uses a same image, $R_n$, for both reference image (r) 620 and real hair image ($X_R$) 604. The entire system 600 is trained together to determine the weights 804 using the objective of Equation (7) and generative adversarial network (GAN) training method. In a second operation, the training module 802 trains the real appearance renderer ($G_R$) 658 with the temporal condition in operation 666. Only the real portion of the system 600 is used for the training and the temporal condition in operation 666 is set to true 50% of the time or another percentage, when temporal condition in operation 666 is true, the warped result of the previous frame $W(i^{t-1}, w^t)$ is feed into real appearance renderer ($G_R$) 658 when generating a current frame $i^t$.

In some examples, the training module 802 uses Equation (7) and a learning rate of 0.0001 for the basic training of the first operation and a learning rate of 0.000001 for the temporal training of the second operation. The training resolution of the images of the training data 800 are 512×512 pixels, in accordance with some examples. Weights $\lambda_p$, $\lambda_s$, and $\lambda_g$ are set to 10, 1, and 1 for Equation (7), in accordance with some examples. Other values for the parameters of training may be used.

After the system 600 is trained with weights 804, then the production module 810 can use neural hair rendering system 700 with weights 806. Weights 806 are the weights 804 that correspond to the fake encoder ($E_F$) 628, cross-domain structure embedding (e) 644, feature map A 648, and real appearance renderer 658. Additionally, the training module 802 may have additional weights for neural networks to generate structure fake hair ($S_F$) 616. The production module 810 may be resident on a client device 102. The production module 810 is used to generate the results illustrated in FIGS. 10A, 10B, and 10C. The production module 810 is configured to take an image or series of images from a client device 102 as real hair image ($X_R$) 604 and generate synthesized real image ($i_R$) 670 based on a selection of a reference image (r) 620 and a 3D hair model (h) 602. In some examples, the reference image (r) 620 defaults to the real hair image ($X_R$) 604. The production module 810 causes display of one or more of the images to the client device 102. The production module 810 provides a user interface for the user of the client device 102 to select one or more of 3D hair model (h) 602, real hair image ($X_R$) 604, and reference image (r) 620. The client device 102 provides the camera parameters. The production module 810 via the messaging system 100 provides the ability of a user of the client device 102 to post or send, which may be ephemeral, the synthesized real image ($i_R$) 670 or series of synthesized real images ($i_R$) 670. The synthesized real image ($i_R$) 670 may be modified with an augmentation as described in conjunction with FIG. 11.

Figure 10A:
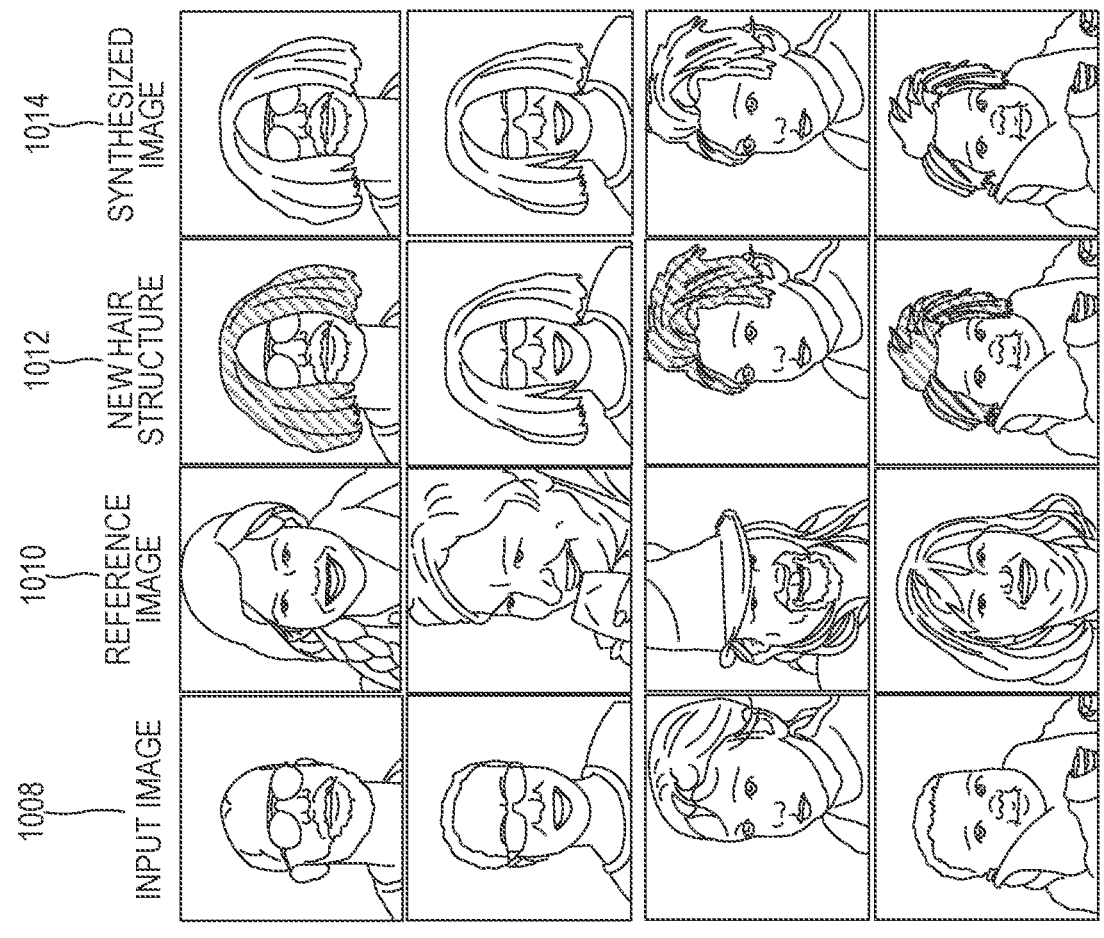
FIGS. 10A, 10B, and 10C illustrate results of using the neural hair rendering system to generate synthetic images.
Figure 10A:
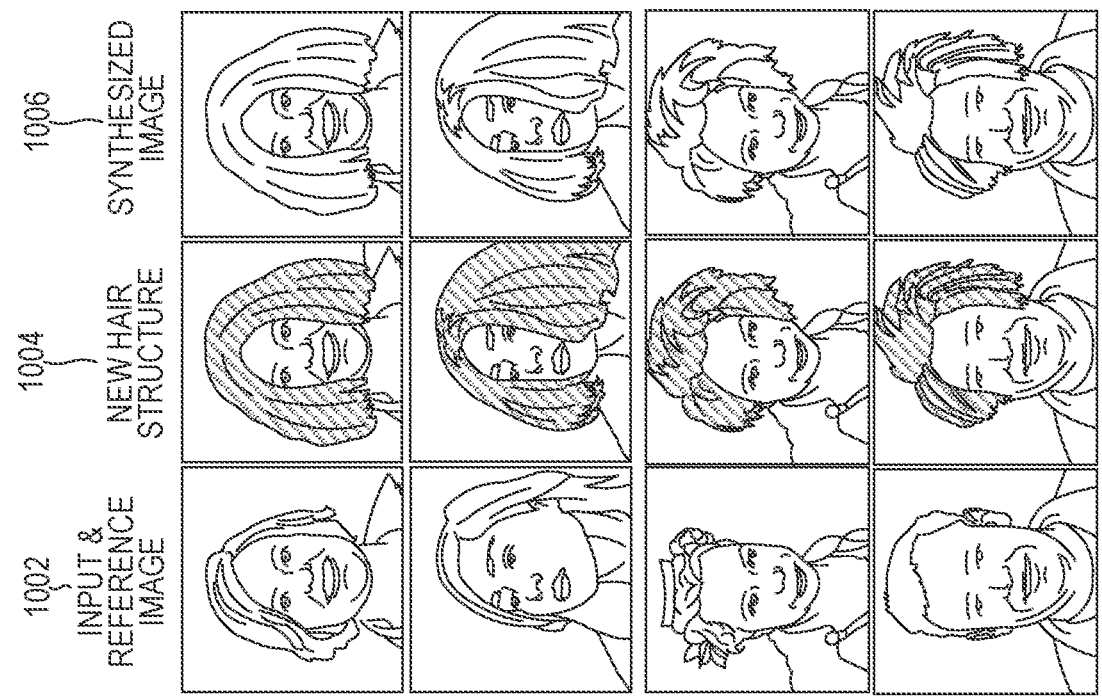
Figure 10B:
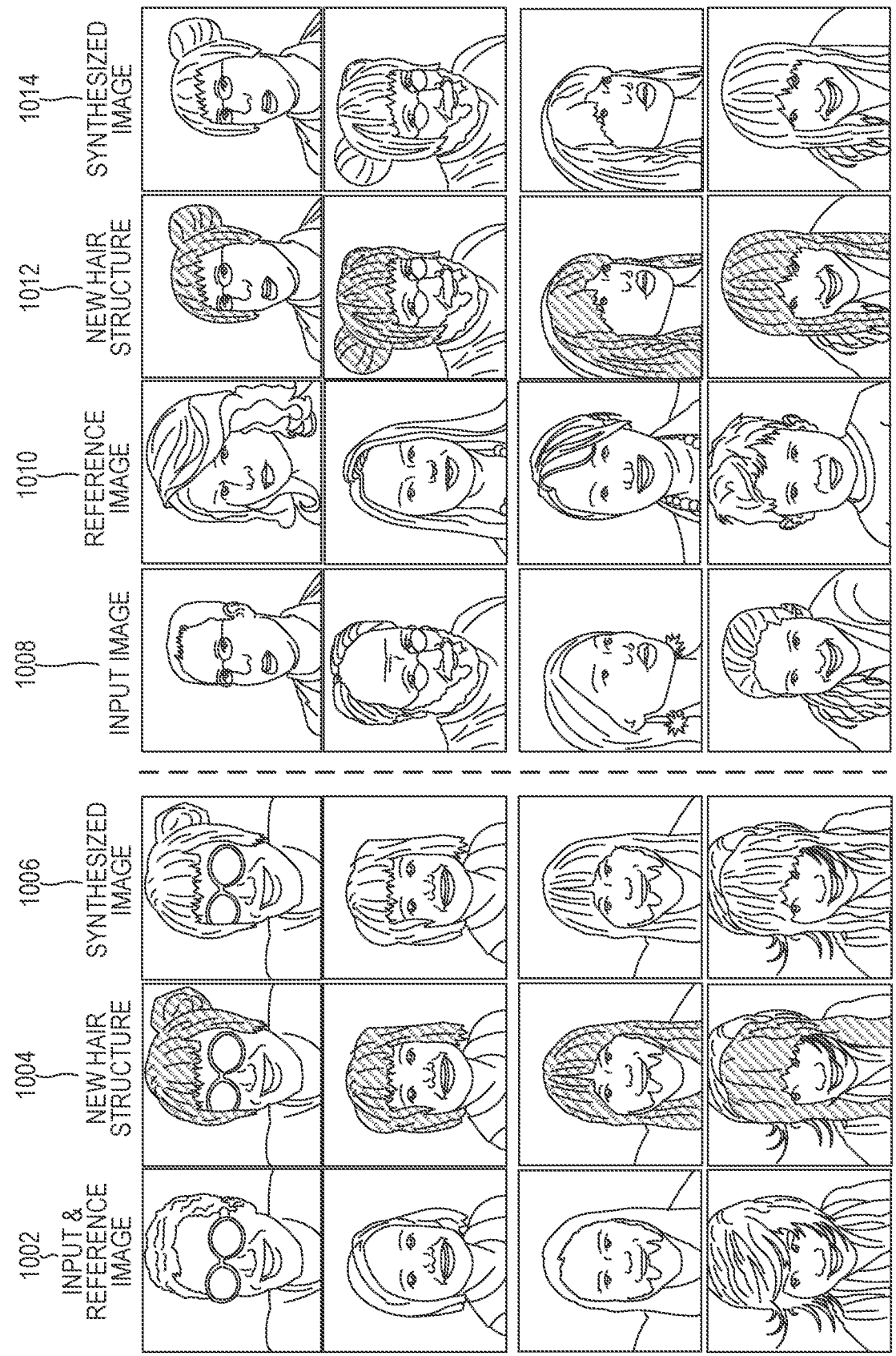
Figure 10C:
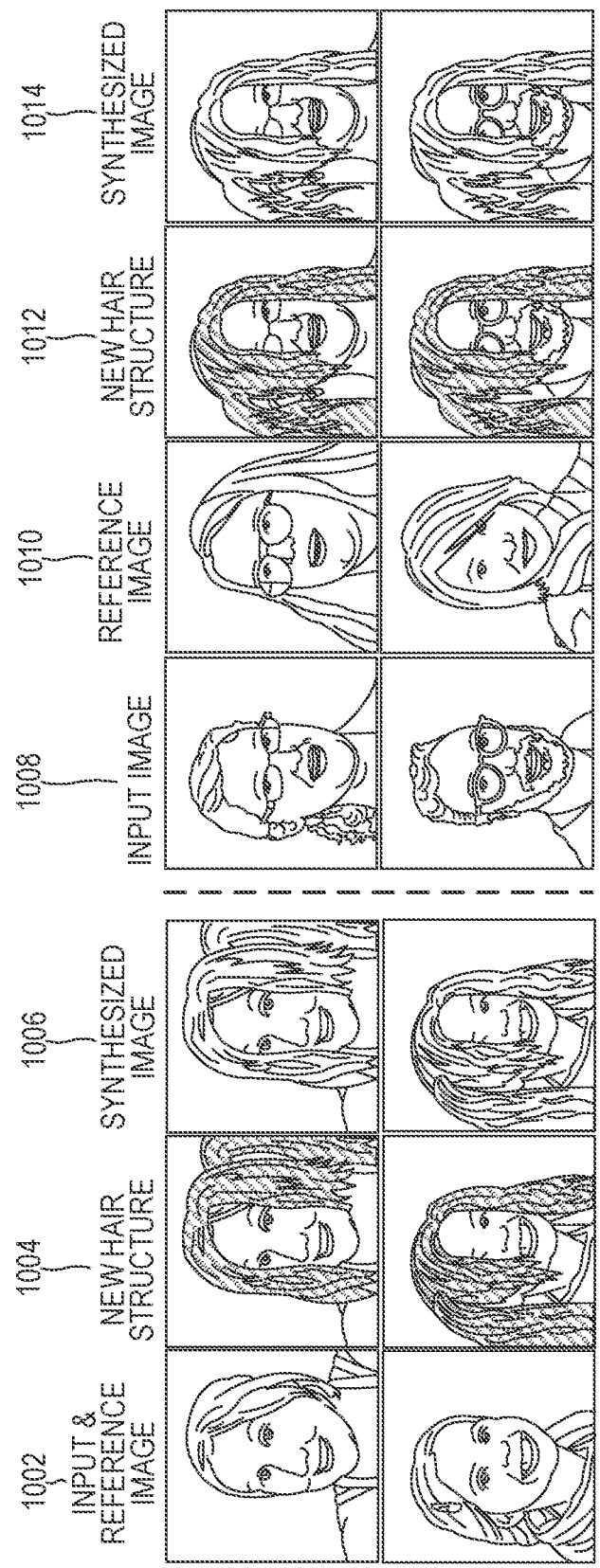

FIGS. 10A, 10B, and 10C illustrate results of using the neural hair rendering system 700 to generate synthetic images. The neural hair rendering system 700 processes input and reference image 1002 to generate new hair structure 1004 and synthesized image 1006. The 3D hair model (h) 602 used from FIG. 9 can be inferred from the new hair structure 1004 and new hair structure 1012.

The input and reference image 1002 corresponds to both the real hair image ($X_R$) 604 and the reference image (r) 620. The input image 1008 corresponds to the real hair image ($X_R$) 604. The reference image 1010 corresponds to the reference image (r) 620. New hair structure 1004 and new hair structure 1012 correspond to structure fake hair ($S_F$) 616. Synthesized image 1006 and synthesized image 1014 correspond to real image ($i_R$) 670, which is the output of the neural hair rendering system 700.

By applying a 3D hair model (h) 602 we can modify the human hair shape but keep the original hair appearance and orientation, which is illustrated by column synthesized image 1006 where the input and reference image 1002 are the same. However, when the input image 1008 and reference image 1010 are different then both the structure and appearance of the hair from input image 1008, which may be real hair image ($X_R$) 604, may be changed in accordance with the structure of the 3D hair model (h) 602 and appearance of the reference image 1010, which corresponds with reference image (r) 620.

FIG. 11 illustrates an example application illustrating a synthesized image 1118, in accordance with some examples. Illustrated in FIG. 11 is mobile device 1102, screen 1104, edit and enhance 1106, 3D hair model 1108, send 1110, input image 1112, save 1114, reference image 1116, synthesized image 1118, and camera 1120. The production module 810 is using the neural hair rendering system 700 with weights 806 to generate synthesized image 1118 from reference image 1116, 3D hair model 1108, and input image 1112. Referring to FIGS. 7 and 11, synthesized image 1118 corresponds to synthesized real image ($i_R$) 670; reference image 1116 corresponds to reference image (r) 620; 3D hair model 1108 corresponds to 3D hair model (h) 602; and input image 1112 corresponds to real hair image ($X_R$) 604. The mobile device 1102 may also be providing camera parameters (c) to the production module 810, which may be used in the process of generating synthesized image 1118 and structure fake hair ($S_F$) 616.

A user (not illustrated) may select the reference image 1116 to be the same as the input image 1112, which is not illustrated but corresponds to input and reference image 1002 of FIGS. 10A, 10B, and 10C. The input image 1112 is an image or a series of images being generated by the mobile device 1102 from the camera 1120. The reference image 1116 is an image selected by the user or suggested by the production module 810. In some examples, the reference image 1116 defaults to the input image 1112. The 3D hair model 1108 is selected by the user or suggested by the production module 810. The user may send 1110 the synthesized image 1118 as a message or an ephemeral message, post the synthesized image 1118 to a story, and so forth. The user may edit and enhance 1106 the synthesized image 1118 where enhance 1106 enables editing the image as well as adding augmentations. The user may save 1114 the image to a storage device associated with the user and social network 100.

Figure 12:
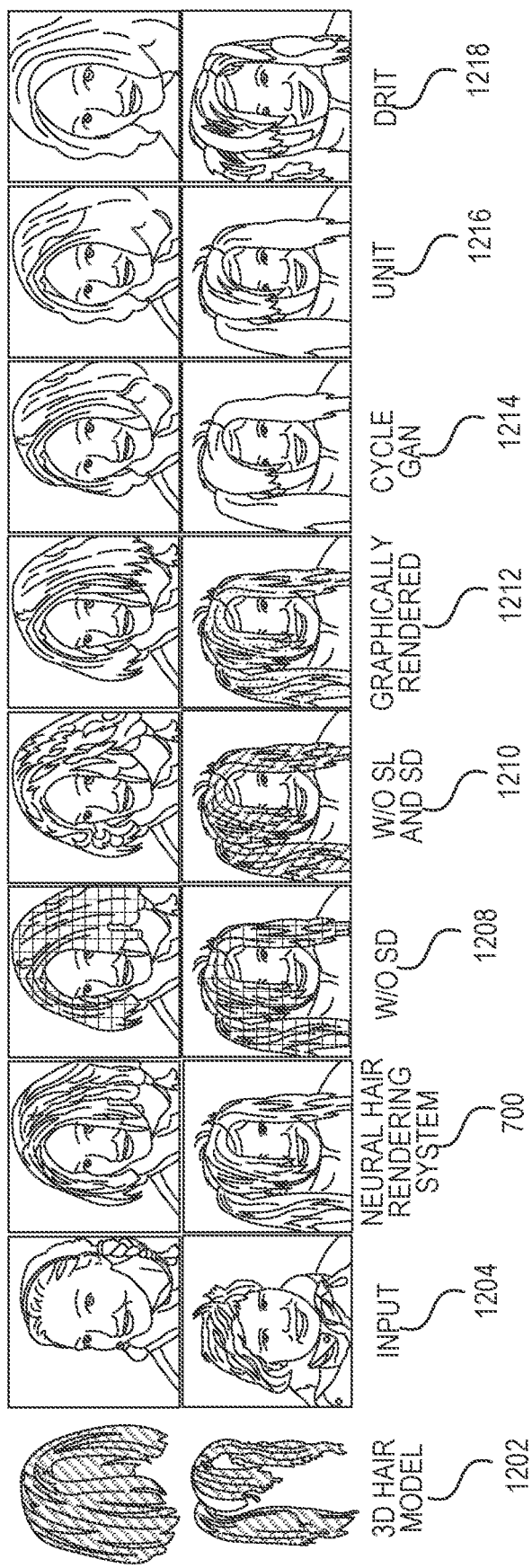
FIG. 12 illustrates visual comparisons of results using neural hair rendering system with other methods and ablation.

FIG. 12 illustrates visual comparisons of results using neural hair rendering system compared with other methods and ablation. Table 1 illustrates numerical comparisons of neural hair rendering system 700 with other methods and ablation. FIG. 12 and Table 1 are disclosed in conjunction with one another.

Table 1 illustrates method, Fréchet Inception Distance (FID) where a lower value is better, Intersection-over-Union (IoU) where a higher value is better, and pixel accuracy (Accuracy) where a higher value is better. FID measures the distribution distance between two domains. Intersection-over-Union (IoU) and pixel accuracy (Accuracy) are determined by applying a pretrained hair segmentation model on the generated images from the various methods to get a hair mask, and then comparing the hair mask with the ground truth hair mask, which is the input hair mask. The segmentation model predicts the hair mask that is the most similar to the ground truth.

TABLE 1

Comparison and Ablation

| Method | FID (↓) | IoU (%)(↑) | Accuracy (%)(↑) |
|---|---|---|---|
| Graphic Renderer | 98.62 | 55.77 | 86.17 |
| CycleGAN | 107.11 | 46.46 | 84.06 |
| UNIT | 116.79 | 30.89 | 84.27 |
| DRIT | 174.39 | 30.69 | 65.80 |
| w/o SL and SD | 94.25 | 80.10 | 93.89 |
| w/o SD | 77.09 | 86.60 | 96.35 |
| Neural hair rendering system 700 | 57.08 | 86.74 | 96.45 |

As illustrated in Table 1, graphic renderer indicates a traditional graphic rendering pipeline, which is inferior to neural hair rendering system 700 with a 98.62 FID, 55.77 IoU, and 86.17 Accuracy compared with 57.08 FID, 86.74 IoU, and Accuracy of 96.45 of the neural hair rendering system 700. CycleGAN, UNIT, and DRIT are neural networks for image translation and graphic rendering. Cycle-GAN, UNIT, and DRIT are all inferior to the neural hair rendering system 700. Without (w/o) shared latent space (SL) and spatial discriminator (SD) (w/o SL and SD) indicate results of neural hair rendering system 700 where the system 600 is trained without cross-domain structure embedding (e) 644 or structure discriminator ($D_S$) 678. Without SD indicates the results of neural hair rendering system 700 without the system 600 being trained with structure discriminator ($D_S$) 678. The low value of FID for neural hair rendering system 700 indicates that neural hair rendering system 700 can generate high-fidelity hair images that contain similar hair appearance distribution as images from the real domain. The high IoU and Accuracy indicate the ability of neural hair rendering system 700 to minimize a structure gap between real and fake domain data structures so that the synthesized real images can follow the manually designed structure of the 3D model.

Additionally, the poor performance of w/o SL and SD, and w/o SD indicate that both the structure discriminator ($D_S$) 678 and cross-domain structure embedding (e) 644 are important parts of the system 600 training and the operation of neural hair rendering system 700. The structure discriminator ($D_S$) 678 forces the hair structure features to be domain invariant and the cross-domain structure embedding (e) 644 enables fake domain and real domain structures to be represented together. The shared encoder layers help the neural hair rendering system 700 to find a common latent space that embeds hair structural knowledge that is invariant of the different data structures used by the real domain and the fake domain in encoding the hair.

FIG. 12 illustrates visual comparisons of results using neural hair rendering system 700 with other methods and ablation. Illustrated in FIG. 12 is 3D hair model 1202, input 1204, neural hair rendering system 700, w/o SD 1208, w/o SL and SD 1210, graphically rendered 1212, CycleGAN 1214, UNIT 1216, and DRIT 1218. Referring to FIGS. 7 and 12, the input 1204 is use for both the reference image (r) 620 and the real hair image 604 ($X_R$).

The graphically rendered 1212, CycleGAN 1214, UNIT 1216, and DRIT 1218 have much clearer hair masks so that the 3D hair model 1202 is apparent compared with the neural hair rendering system 700. The 3D hair model 1202 being apparent means that it appears to be fake hair rendered on the image. FIG. 12 illustrates that w/o SD 1208 and w/o SL and SD 1210 qualitatively perform worse than neural hair rendering system 700.

FIG. 13 illustrates the temporal conditioning results, in accordance with some examples. Referring to FIGS. 7 and 13, reference image 1300 is reference image (r) 620; the images of the top row 1306 are the raw input of the real hair image 604 ($X_R$); the images of the middle row 1308 are synthesized real images ($i_R$) 670 without the temporal condition of operation 666 turned on; and, the images of the bottom row 1310 are synthesized real images ($i_R$) 670 with the temporal condition of operation 666 turned on.

The appearance and condition of operation 654 is being taken from reference image 1300 with the 3D hair model 902 on the top row of FIG. 9 being used as the 3D hair model (h) 602. FIG. 13 illustrates that the temporal condition of operation 666 is effective in reducing flicker.

In the images of the bottom row 1310 with the boxes 1302B and 1304B and close-ups 1303B and 1305B, respectively, illustrate that there is flickering without the temporal conditioning of operation 666. The denser hair indicates that there are still partial images of the hair from previous images. The image of the top row 1306 with boxes 1302A and 1304A and close-ups 1303A and 1305A, respectively, indicate that flickering has been reduced. The less dense hair indicates that the flicker is reduced as the position of the hair is more certain and not draw multiple times.

Figure 14:
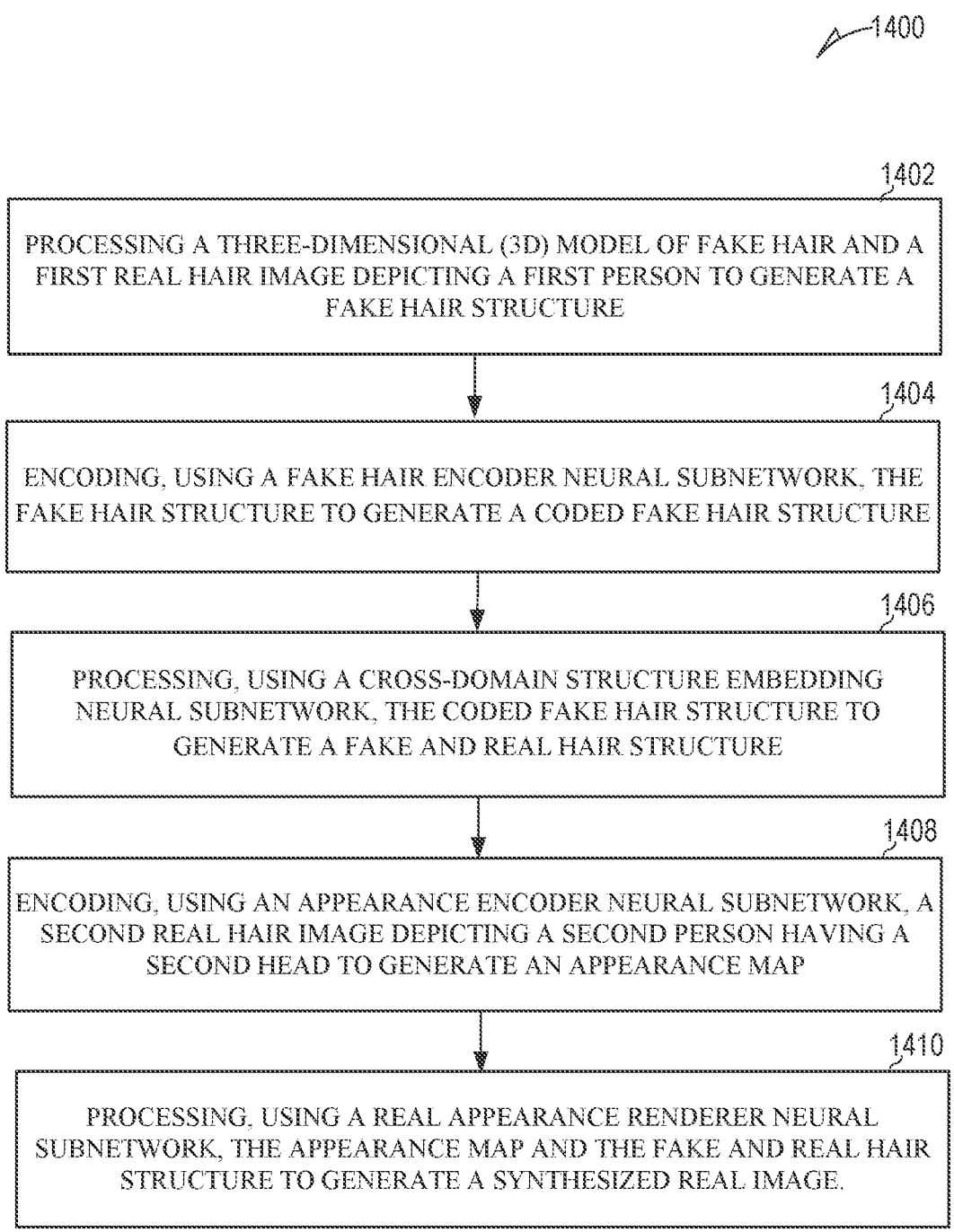
FIG. 14 illustrates a method for neural hair rendering, in accordance with some examples.

FIG. 14 illustrates a method 1400 for neural hair rendering, in accordance with some examples. The method 1400 begins at operation 1402 with processing a 3D model of fake hair and a first real hair image depicting a first person having a first head to generate a fake hair structure, the fake hair structure comprising the 3D model of fake hair oriented in accordance with an orientation of the first head of the first person. For example, referring to FIG. 7, in operation 608, the training module 802 processes the 3D hair model (h) 602 and real hair image 604 ($X_R$) to generate structure fake hair ($S_F$) 616.

The method 1400 continues at operation 1404 with encoding, using a fake hair encoder neural subnetwork, the fake hair structure to generate a coded fake hair structure. For example, referring to FIG. 7, in operation 636, the training module 802 feeds the output of the fake encoder ($E_F$) 628 into the cross-domain structure embedding (e) 644 to generate coded fake hair structure.

The method 1400 continues at operation 1406 with processing, using a cross-domain structure embedding neural subnetwork, the coded fake hair structure to generate a fake and real hair structure. For example, referring to FIG. 7, in operation 636, the training module 802 feeds the output of the fake encoder ($E_F$) 628 into the cross-domain structure embedding (e) 644 to generate coded fake hair structure.

The method 1400 continues at operation 1408 with encoding, using an appearance encoder neural subnetwork, a second real hair image depicting a second person having a second head to generate an appearance map. For example, in operation 626, the training module 802, processes the reference image (r) 620 with the appearance encoder ($E_m$) 632 to encode material properties of the hair from reference image (r) 620. And, in operation 640, the training module 802 feeds the output of the appearance encoder ($E_m$) 632 into feature map A 648. The training module 802 determines the appearance map using Equation (1) as described above.

The method 1400 continues at operation 1410 with processing, using a real appearance renderer neural subnetwork, the appearance map and the fake and real hair structure to generate a synthesized real image. For example, referring to FIG. 7, in operation 664, the training module 802 processes the output of the cross-domain structure embedding (e) 644, the output of feature map A 648, and, optionally, temporal condition in operation 666 with real appearance renderer 658 to generate the synthesized real image ($i_R$) 670.

The method 1400 may include one or more operation as described in conjunction with FIG. 7 and herein. The production module 810 is configured to perform the operations of method 1400. One or more of the operations of method 1400 are optional. The operations of method 1400 may be performed in a different order. Method 1400 may include one or more additional operations.

Figure 15:
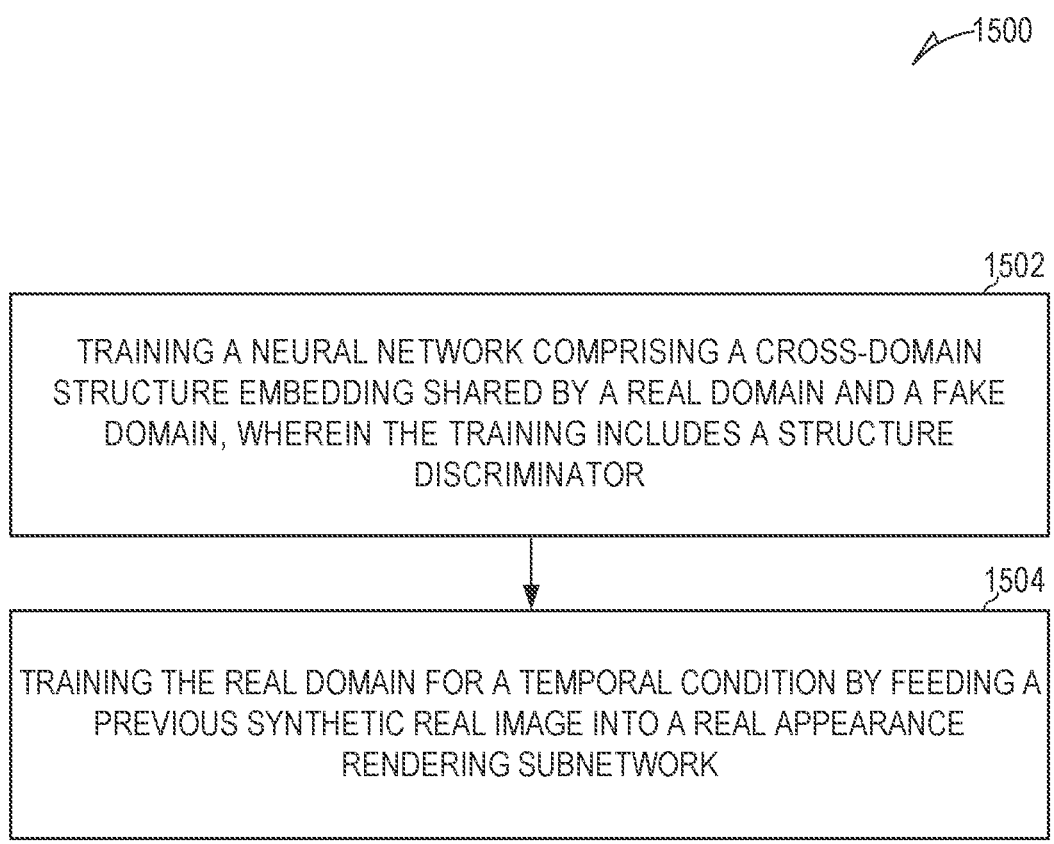
FIG. 15 illustrates a method for training a neural network for neural hair rendering, in accordance with some examples.

FIG. 15 illustrates a method 1500 for training a neural network for neural hair rendering, in accordance with some examples. The method 1500 begins at operation 1502 with training a neural network comprising a cross-domain structure embedding shared by a real domain and a fake domain, where the training includes a structure discriminator. For example, as disclosed in FIG. 6 and herein the system 600 comprises a real domain and a fake domain and includes cross-domain structure embedding (e) 644, which is shared by the real domain and the fake domain. Additionally, structure discriminator ($D_S$) 678 is used to train cross-domain structure embedding (e) 644 for consistency between the structures used to encode structure real hair ($S_R$) 618 and to encode the structure fake hair ($S_F$) 616.

Method 1500 continues at operation 1504 with training the real domain for a temporal condition by feeding a previous synthetic real image into a real appearance rendering subnetwork. As disclosed in conjunction with FIG. 6 and herein temporal condition in operation 666 indicates that a warped result of a previous frame W($i^{t-1}$, $w^t$) is fed back into the real appearance rendering subnetwork ($G_R$) 658. The system 600 is first trained without the temporal condition in operation 666 and then only the real domain is trained with randomly using the temporal condition a predetermined percentage of the time such as 50% of the time.

The method 1500 optionally continues with reconfiguring system 600 in accordance with the FIG. 7 and performing the operations of method 1400. Method 1500 may include one or more additional operations. One or more of the operations of method 1500 are be optional. One or more of the operations of method 1500 may be performed in a different order.

The following describes additional examples. Example 1 is a method including: processing, using at least one processor of a device, a three-dimensional (3D) model of fake hair and a real hair image depicting a person having a head to generate a fake hair structure, the fake hair structure including the 3D model of fake hair oriented in accordance with an orientation of the head of the person; processing the 3D model of fake hair and the real hair image depicting the person having the head to render a fake hair image, the fake hair image including an image of the person with the 3D model of fake hair rendered in accordance with the orientation of the head of the person; encoding, using a fake hair encoder neural subnetwork, the fake hair structure to generate coded fake hair structure; processing the real hair image to generate a real hair structure, the real hair structure including a 3D model of hair depicted on the head of the person; encoding, using a real hair encoder neural subnetwork, the real hair structure to generate coded real hair structure; processing, using a cross-domain structure embedding neural subnetwork, the coded fake hair structure and the coded real hair structure to generate fake and real hair structure; processing, using a fake appearance renderer neural subnetwork, the fake and real hair structure to generate a synthesized fake image; processing the synthesized fake image with the fake hair image to determine a fake reconstruction loss between the fake hair image and the synthesized fake image; and adjusting weights of the fake hair encoder neural subnetwork, the real hair encoder neural subnetwork, the cross-domain structure embedding neural subnetwork, and the fake appearance renderer neural subnetwork based on the determined fake reconstruction loss.

In Example 2, the subject matter of Example 1 includes, encoding, using an appearance encoder neural subnetwork, the real hair image to generate a feature vector; processing the feature vector to generate an appearance map; processing, using a real appearance renderer neural subnetwork, the appearance map and the fake and real hair structure to generate a synthesized real image; processing the synthesized real image with the image depicting a person to determine a real reconstruction loss between the image depicting the person and the synthesized real image; and adjusting weights of the fake hair encoder neural subnetwork, the real hair encoder neural subnetwork, the cross-domain structure embedding neural subnetwork, the fake appearance renderer neural subnetwork, the appearance encoder neural subnetwork, and the real appearance renderer neural subnetwork based on the determined real reconstruction loss.

In Example 3, the subject matter of Example 2 includes, determining a hair motion flow based on a warping of the 3D model of fake hair from a first previous synthesized real image and a second previous synthesized real image; and where processing, using the real appearance renderer neural subnetwork further includes: processing, using the real appearance renderer neural subnetwork, the appearance map, the fake and real hair structure, and the hair motion flow to generate the synthesized real image.

In Example 4, the subject matter of Examples 2-3 includes, where the fake hair encoder neural subnetwork and the real hair encoder neural subnetwork comprise one or more common layers.

In Example 5, the subject matter of Examples 2-4 includes, where the fake hair image is rendered based on camera settings associated with the real hair image.

In Example 6, the subject matter of Examples 2-5 includes, where processing the feature vector to generate the appearance map includes: setting to 0 a value of a position of the feature vector based on the position being outside of the real hair structure.

In Example 7, the subject matter of Example 6 includes, processing, using a structure discriminator neural subnetwork, the coded fake hair structure and the coded real hair structure to determine adversarial losses of the structure discriminator neural subnetwork; processing, using a fake discriminator neural subnetwork, the fake hair image and the synthesized fake image to determine adversarial losses of the fake discriminator neural subnetwork; processing, using a real discriminator neural subnetwork, the real hair image and the synthesized real image to determine adversarial losses of the real discriminator neural subnetwork; and determining perceptual losses between layers of the real appearance renderer neural subnetwork and the fake appearance renderer neural subnetwork.

In Example 8, the subject matter of Example 7 includes, training the fake hair encoder neural subnetwork, the real hair encoder neural subnetwork, the cross-domain structure embedding neural subnetwork, the fake appearance renderer neural subnetwork, the appearance encoder neural subnetwork, the real appearance renderer neural subnetwork, the fake appearance renderer neural subnetwork, the real discriminator neural subnetwork, the fake discriminator neural subnetwork, and the structure discriminator neural subnetwork based on the fake reconstruction loss, the real reconstruction loss, the adversarial losses of the structure discriminator neural subnetwork, the adversarial losses of the fake discriminator neural subnetwork, and adversarial losses of the real discriminator neural subnetwork.

Example 9 is at least one machine-readable medium including instructions that, when executed by processing circuitry, cause the processing circuitry to perform operations to implement of any of Examples 1-8.

Example 10 is an apparatus including means to implement of any of Examples 1-8.

Example 11 is a system to implement of any of Examples 1-8.

Example 12 is a method to implement of any of Examples 1-8.

MACHINE ARCHITECTURE

Figure 16:
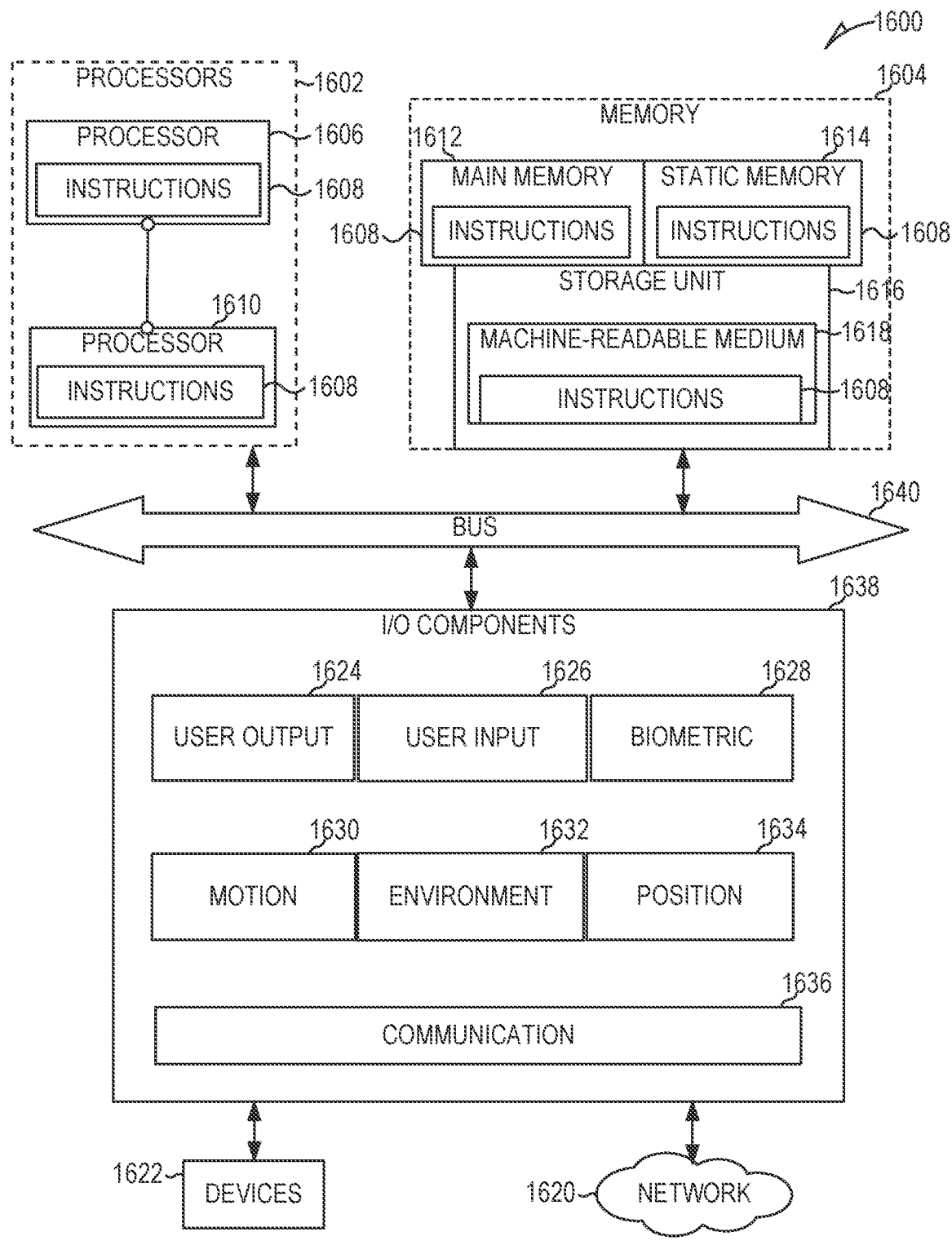
FIG. 16 is a diagrammatic representation of a machine in the form of a computer system within which a set of instructions may be executed for causing the machine to perform any one or more of the methodologies discussed herein, in accordance with some examples.

FIG. 16 is a diagrammatic representation of the machine 1600 within which instructions 1608 (e.g., software, a program, an application, an applet, an app, or other executable code) for causing the machine 1600 to perform any one or more of the methodologies discussed herein may be executed. For example, the instructions 1608 may cause the machine 1600 to execute any one or more of the methods described herein. The instructions 1608 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machines that individually or jointly execute the instructions 1608 to perform any one or more of the methodologies discussed herein. The machine 1600, for example, may comprise the client device 102 or any one of a number of server devices forming part of the messaging server system 108. In some examples, the machine 1600 may also comprise both client and server systems, with certain operations of a particular method or algorithm being performed on the server-side and with certain operations of the particular method or algorithm being performed on the client-side.

The machine 1600 may include processors 1602, memory 1604, and input/output I/O components 1638, which may be configured to communicate with each other via a bus 1640. The processors 1602 may be termed computer processors, in accordance with some examples. In an example, the processors 1602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1606 and a processor 1610 that execute the instructions 1608. The term "processor" is intended to include multi-core processors that may comprise two or more independent processors (sometimes referred to as "cores") that may execute instructions contemporaneously. Although FIG. 16 shows multiple processors 1602, the machine 1600 may include a single processor with a single-core, a single processor with multiple cores (e.g., a multi-core processor), multiple processors with a single core, multiple processors with multiples cores, or any combination thereof.

The memory 1604 includes a main memory 1612, a static memory 1614, and a storage unit 1616, both accessible to the processors 1602 via the bus 1640. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the processors 1602 (e.g., within the Processor's cache memory), or any suitable combination thereof, during execution thereof by the machine 1600.

The I/O components 1638 may include a wide variety of components to receive input, provide output, produce output, transmit information, exchange information, capture measurements, and so on. The specific I/O components 1638 that are included in a particular machine will depend on the type of machine. For example, portable machines such as mobile phones may include a touch input device or other such input mechanisms, while a headless server machine will likely not include such a touch input device. It will be appreciated that the I/O components 1638 may include many other components that are not shown in FIG. 16. In various examples, the I/O components 1638 may include user output components 1624 and user input components 1626. The user output components 1624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1638 may include biometric components 1628, motion components 1630, environmental components 1632, or position components 1634, among a wide array of other components. For example, the biometric components 1628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1630 include acceleration sensor components (e.g., accelerometer), gravitation sensor components, rotation sensor components (e.g., gyroscope).

The environmental components 1632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1638 further include communication components 1636 operable to couple the machine 1600 to a network 1620 or devices 1622 via respective coupling or connections. For example, the communication components 1636 may include a network interface Component or another suitable device to interface with the network 1620. In further examples, the communication components 1636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1622 may be another machine or any of a wide variety of peripheral devices (e.g., a peripheral device coupled via a USB).

Moreover, the communication components 1636 may detect identifiers or include components operable to detect identifiers. For example, the communication components 1636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1636, such as location via Internet Protocol (IP) geolocation, location via Wi-Fi® signal triangulation, location via detecting an NFC beacon signal that may indicate a particular location, and so forth.

The various memories (e.g., main memory 1612, static memory 1614, and memory of the processors 1602) and storage unit 1616 may store one or more sets of instructions and data structures (e.g., software) embodying or used by any one or more of the methodologies or functions described herein. These instructions (e.g., the instructions 1608), when executed by processors 1602, cause various operations to implement the disclosed examples.

The instructions 1608 may be transmitted or received over the network 1620, using a transmission medium, via a network interface device (e.g., a network interface component included in the communication components 1636) and using any one of several well-known transfer protocols (e.g., hypertext transfer protocol (HTTP)). Similarly, the instructions 1608 may be transmitted or received using a transmission medium via a coupling (e.g., a peer-to-peer coupling) to the devices 1622.

SOFTWARE ARCHITECTURE

Figure 17:
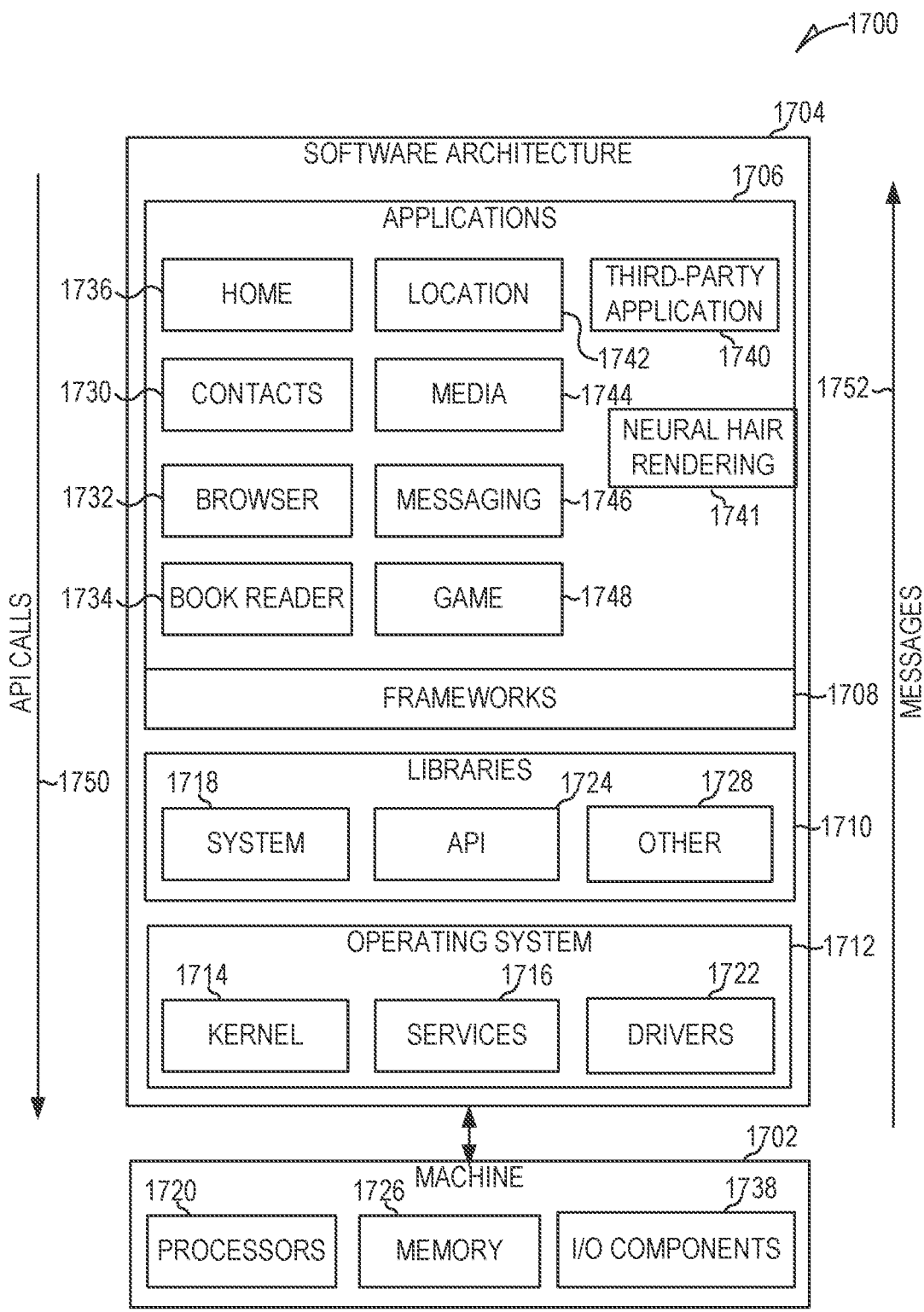
FIG. 17 is a block diagram showing a software architecture within which examples may be implemented.

FIG. 17 is a block diagram 1700 illustrating a software architecture 1704, which can be installed on any one or more of the devices described herein. The software architecture 1704 is supported by hardware such as a machine 1702 that includes processors 1720, memory 1726, and I/O components 1738. In this example, the software architecture 1704 can be conceptualized as a stack of layers, where each layer provides a particular functionality. The software architecture 1704 includes layers such as an operating system 1712, libraries 1710, frameworks 1708, and applications 1706. Operationally, the applications 1706 invoke API calls 1750 through the software stack and receive messages 1752 in response to the API calls 1750.

The operating system 1712 manages hardware resources and provides common services. The operating system 1712 includes, for example, a kernel 1714, services 1716, and drivers 1722. The kernel 1714 acts as an abstraction layer between the hardware and the other software layers. For example, the kernel 1714 provides memory management, processor management (e.g., scheduling), component management, networking, and security settings, among other functionality. The services 1716 can provide other common services for the other software layers. The drivers 1722 are responsible for controlling or interfacing with the underlying hardware. For instance, the drivers 1722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1710 provide a common low-level infrastructure used by the applications 1706. The libraries 1710 can include system libraries 1718 (e.g., C standard library) that provide functions such as memory allocation functions, string manipulation functions, mathematic functions, and the like. In addition, the libraries 1710 can include API libraries 1724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1710 can also include a wide variety of other libraries 1728 to provide many other APIs to the applications 1706.

The frameworks 1708 provide a common high-level infrastructure that is used by the applications 1706. For example, the frameworks 1708 provide various graphical user interface (GUI) functions, high-level resource management, and high-level location services. The frameworks 1708 can provide a broad spectrum of other APIs that can be used by the applications 1706, some of which may be specific to a particular operating system or platform.

In an example, the applications 1706 may include a home application 1736, a contacts application 1730, a browser application 1732, a book reader application 1734, neural hair rendering application 1741, a location application 1742, a media application 1744, a messaging application 1746, a game application 1748, and a broad assortment of other applications such as a third-party application 1740. The neural hair rendering application 1741 may perform the operations as disclosed in conjunction with FIGS. 6-15 and herein. The applications 1706 are programs that execute functions defined in the programs. Various programming languages can be employed to create one or more of the applications 1706, structured in a variety of manners, such as object-oriented programming languages (e.g., Objective-C, Java, or C++) or procedural programming languages (e.g., C or assembly language). In a specific example, the third-party application 1740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1740 can invoke the API calls 1750 provided by the operating system 1712 to facilitate functionality described herein.

PROCESSING COMPONENTS

Figure 18:
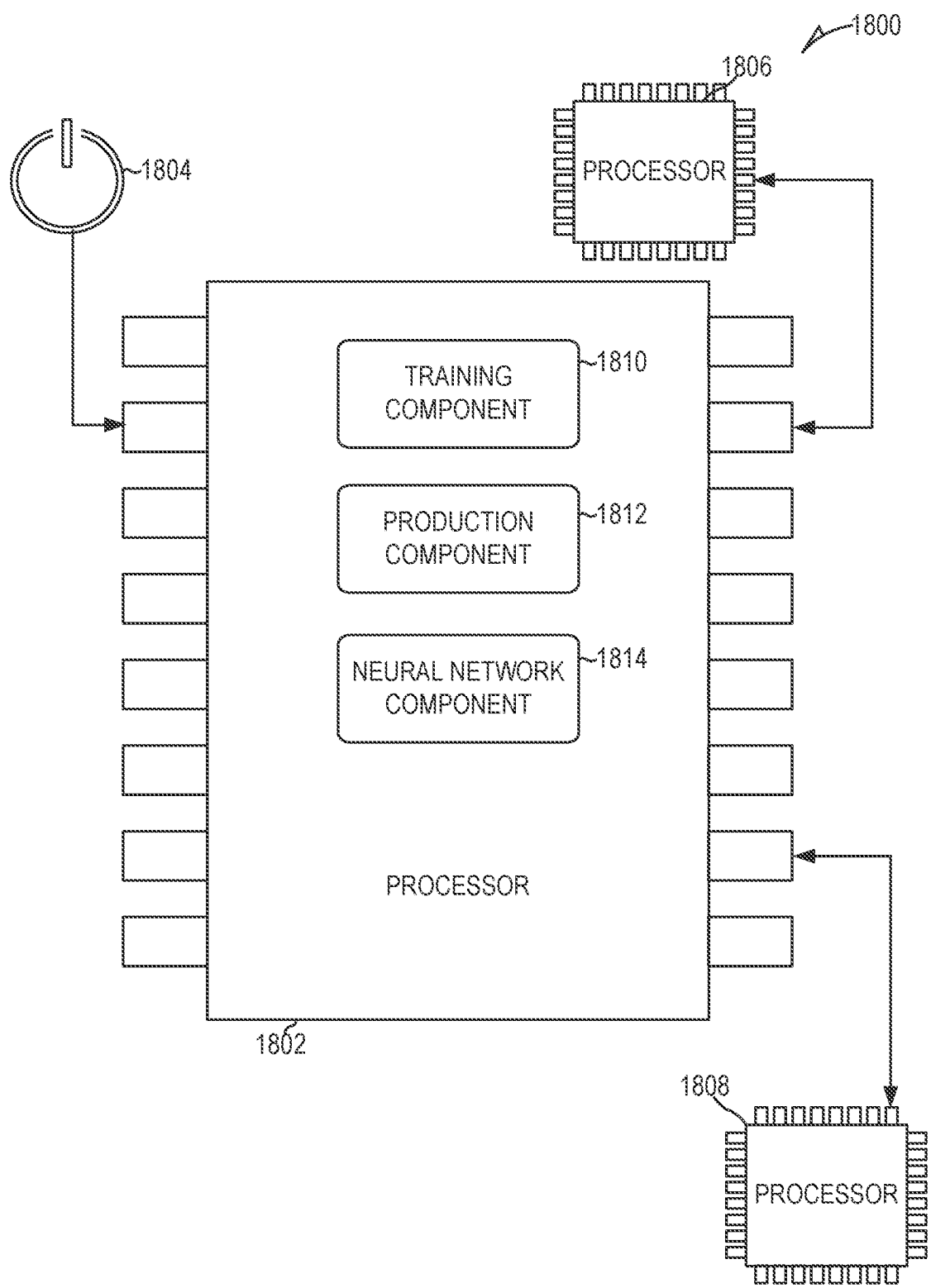
FIG. 18 is a diagrammatic representation of a processing environment, in accordance with some examples.

Turning now to FIG. 18, there is shown a diagrammatic representation of a processing environment 1800, which includes a processor 1802, a processor 1806, and a processor 1808 (e.g., a GPU, CPU or combination thereof). The processor 1802 is shown to be coupled to a power source 1804, and to include (either permanently configured or temporarily instantiated) modules, namely a training component 1810, a production component 1812, and a neural network component 1814. Referring to FIG. 8, the training component 1810 operationally trains system 600 and performs method 1500; the production component 1812 operationally performs the operations for the neural hair rendering system 700; and, the neural network component 1814 operationally assists in performing operations for training and production of the system 600 and neural hair rendering system 700. As illustrated, the processor 1802 is communicatively coupled to both the processor 1806 and the processor 1808.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1602 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
processing, using one or more processors of a device, a three-dimensional (3D) model of fake hair and a first image of a first person with real hair to generate a second image of a fake hair structure;
encoding, using a first neural network, the second image of the fake hair to generate a fake hair encoding;
encoding, using a second neural network, a third image depicting a second person with real hair to generate an appearance map; and
processing, using a third neural network, the appearance map and the fake hair encoding to generate a fourth image of the second person with the fake hair in accordance with the appearance map.

2. The method of claim 1 further comprising:
encoding, using a fourth neural network, the first image to generate a real hair encoding, and wherein the processing, using the third neural network further comprises:
processing, using a third neural network, the appearance map, the real hair encoding, and the fake hair encoding to generate the fourth image of the second person with the fake hair in accordance with the appearance map.

3. The method of claim 1 wherein the first neural network is a cross-domain structure embedding neural subnetwork, the second neural network is a cross-domain structure embedding neural subnetwork, and the third neural network is a real appearance renderer neural subnetwork.

4. The method of claim 3 wherein the fourth neural network is a real hair encoding neural network and the real hair encoding neural network and the fake hair encoding neural network share at least two layers.

5. The method of claim 3, wherein the fake hair encoder neural subnetwork and the real hair encoder neural subnetwork are multi-layer neural networks that share at least two layers.

6. The method of claim 5 wherein the fake hair encoder neural subnetwork and the real hair encoder neural subnetwork comprise down sampling convolution layers followed by residual block layers.

7. The method of claim 1 wherein the first image and the third image are a same image.

8. The method of claim 1 wherein the first person comprises a head, and wherein the second image comprises the first person with the fake hair structure oriented in accordance with an orientation of the head of the first person.

9. The method of claim 1 wherein the processing, using one or more processors of the device, the 3D model further comprises:
rendering, based on camera setting used to capture the first image of the first person, the 3D model of fake hair and the first image of the first person with real hair to generate the second image of the fake hair structure.

10. The method of claim 1, wherein the second image of the fake hair structure comprises a structural representation of the fake hair using a structure.

11. The method of claim 1 wherein the appearance map is a first appearance map, the fake hair in accordance with the first appearance map is a first hair in accordance with the first appearance map, the fake hair encoding is a first fake hair encoding, and wherein the method further comprises:
processing, using the third neural network, a second appearance map, a second fake hair encoding, the fourth image of the second person with the first fake hair in accordance with the first appearance map, and an indication of a temporal condition to generate a fifth image of the person with the second fake hair in accordance with the second appearance map.

12. The method of claim 1 further comprising:
causing to be displayed on a display of a computer the fourth image of the person with the fake hair in accordance with the appearance map.

13. The method of claim 1 wherein the 3D model of fake hair comprises 10 to 200 polygons.

14. The method of claim 1 wherein the second image of the fake hair structure comprises a structure of the fake hair.

15. A system comprising:
one or more computer processors; and
one or more computer-readable mediums storing instructions that, when executed by the one or more computer processors, cause the system to perform operations comprising:
processing a three-dimensional (3D) model of fake hair and a first image of a first person with real hair to generate a second image of a fake hair structure;
encoding, using a first neural network, the second image of the fake hair to generate a fake hair encoding;
encoding, using a second neural network, a third image depicting a second person with real hair to generate an appearance map; and
processing, using a third neural network, the appearance map and the fake hair encoding to generate a fourth image of the second person with the fake hair in accordance with the appearance map.

16. The system of claim 15 wherein the operations further comprise:
encoding, using a fourth neural network, the first image to generate a real hair encoding, and wherein the processing, using the third neural network further comprises:
processing, using a third neural network, the appearance map, the real hair encoding, and the fake hair encoding to generate the fourth image of the second person with the fake hair in accordance with the appearance map.

17. The system of claim 15 wherein the first neural network is a cross-domain structure embedding neural subnetwork, the second neural network is a cross-domain structure embedding neural subnetwork, and the third neural network is a real appearance renderer neural subnetwork.

18. The system of claim 17 wherein the fourth neural network is a real hair encoding neural network and the real hair encoding neural network and the fake hair encoding neural network share at least two layers.

19. A non-transitory machine-readable storage device embodying instructions that, when executed by a machine, cause the machine to perform operations comprising:
processing a three-dimensional (3D) model of fake hair and a first image of a first person with real hair to generate a second image of a fake hair structure;
encoding, using a first neural network, the second image of the fake hair to generate a fake hair encoding;
encoding, using a second neural network, a third image depicting a second person with real hair to generate an appearance map; and
processing, using a third neural network, the appearance map and the fake hair encoding to generate a fourth image of the second person with the fake hair in accordance with the appearance map.

20. The non-transitory machine-readable storage device of claim 19 wherein the operations further comprise:
encoding, using a fourth neural network, the first image to generate a real hair encoding, and wherein the processing, using the third neural network further comprises:

processing, using a third neural network, the appearance map, the real hair encoding, and the fake hair encoding to generate the fourth image of the second person with the fake hair in accordance with the appearance map.

\* \* \* \* \*